US011172412B2

(12) United States Patent
Bae et al.

(10) Patent No.: US 11,172,412 B2
(45) Date of Patent: Nov. 9, 2021

(54) ELECTRONIC DEVICE FOR TRANSMITTING AND RECEIVING DATA IN WIRELESS COMMUNICATION SYSTEM AND METHOD THEREFOR

(71) Applicant: Samsung Electronics Co., Ltd., Suwon-si (KR)

(72) Inventors: Moon Gyo Bae, Hwaseong-si (KR); Hye Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/645,190

(22) PCT Filed: Sep. 7, 2018

(86) PCT No.: PCT/KR2018/010524
§ 371 (c)(1),
(2) Date: Mar. 6, 2020

(87) PCT Pub. No.: WO2019/050349
PCT Pub. Date: Mar. 14, 2019

(65) Prior Publication Data
US 2020/0267605 A1    Aug. 20, 2020

(30) Foreign Application Priority Data
Sep. 7, 2017    (KR) .......................... 10-2017-0114625

(51) Int. Cl.
*H04W 36/00*    (2009.01)
*H04B 1/401*    (2015.01)
(Continued)

(52) U.S. Cl.
CPC ........ *H04W 36/0022* (2013.01); *G06F 9/547* (2013.01); *H04W 88/06* (2013.01)

(58) Field of Classification Search
CPC ......... H04W 36/0022; H04W 36/0061; H04W 88/06; H04W 48/18; G06F 9/547; H04B 1/401
See application file for complete search history.

(56) References Cited

U.S. PATENT DOCUMENTS

| 2014/0087785 A1* | 3/2014 | Smadi ................. H04J 11/0023 455/552.1 |
| 2016/0219478 A1* | 7/2016 | Huang-Fu ............. H04W 28/12 |
| 2018/0020386 A1 | 1/2018 | Chandramouli et al. |

FOREIGN PATENT DOCUMENTS

| KR | 10-2006-0063618 A | 6/2006 |
| WO | 2016-122589 A1 | 8/2016 |

OTHER PUBLICATIONS

Nokia, Alcatel-Lucent Shanghai Bell; NR control plane architecture options for LTE-NR tight interworking; 3GPP TSG-RAN WG2 Meeting #94; R2-163511; May 13, 2016, Nanjing, China,.

(Continued)

*Primary Examiner* — Farid Seyedvosoghi
(74) *Attorney, Agent, or Firm* — Jefferson IP Law, LLP

(57) ABSTRACT

Disclosed is an electronic device. The electronic device may include a first modem supporting communication for a first cellular network, a second modem supporting communication for a second cellular network, a processor electrically coupled to the first modem and the second modem, and a memory electrically coupled to the processor and including instructions, and the instructions, when executed by the processor, may cause the processor to perform an operation associated with a radio interface layer (RIL) corresponding to both the first modem and the second modem, and to acquire control information generated by the second modem via a control path connecting the first modem and the RIL. Moreover, various embodiment found through the present disclosure are possible.

14 Claims, 13 Drawing Sheets

(51) Int. Cl.
*G06F 9/54* (2006.01)
*H04W 88/06* (2009.01)

(56) References Cited

OTHER PUBLICATIONS

KT Corp.; Control plane issues for LTE-NR interworking; 3GPP TSG-RAN WG2 #97; R2-1701677; Feb. 3, 2017, Athens, Greece.
ZTE; Consideration on the dual RRC for LTE/NR tight interworking; 3GPP TSG-RAN2 Meeting #94; R2-163739; May 13, 2016; Nanjing, China.
Huawei, HiSilicon; LTE-NR tight interworking control plane; 3GPP TSG-RAN WG2 Meeting #94; R2-164268; May 14, 2016, Nanjing, China.

\* cited by examiner

ELECTRONIC DEVICE FOR TRANSMITTING AND RECEIVING DATA IN WIRELESS COMMUNICATION SYSTEM AND METHOD THEREFOR

TECHNICAL FIELD

Embodiments of the disclosure relate to a 5 generation (5G) communication technology being a next-generation communication technology.

BACKGROUND ART

Nowadays, the 5 generation (5G) communication technology that is a next-generation communication technology of a 4 generation (4G) communication technology is being researched and developed. The 5G communication technology is technically targeted for the following: accommodation of explosive data traffic greater by 1000 times than long term evolution (LTE) being a kind of the 4G communication technology, an epoch-making increase in a transfer rate per user running to an average transfer rate of 1 Gbps, accommodation of the number of connected electronic devices increased dramatically, low end-to-end latency, and high energy efficiency. In 5G, for example, a signal in a higher frequency band than in 4G may be transmitted/received by using a high frequency band such as 28 GHz.

Two schemes, a standalone (SA) scheme and a non-standalone (NSA) scheme, are being discussed as the standard of the 5G network system. The SA scheme may allow a 5G network to communicate with a terminal supporting 5G network communication; according to the SA scheme, the 5G network may be linked with legacy networks, such as existing 2G, 3G, and 4G, in an inter radio access technology (IRAT) interworking scheme. According to the SA scheme, the interworking scheme in which the 5G network is linked with a legacy network may be similar to an interworking scheme between existing legacy networks.

The NSA scheme may be a scheme in which the 5G network is operated as an auxiliary system of a legacy network (e.g., 4G) without an independent operation.

DISCLOSURE

Technical Problem

The SA scheme may be a scheme in which the 4G network and the 5G network are independently implemented and operated. The SA scheme may not support 2G and 3G schemes. In the case of operating the 4G network and the 5G network based on the SA scheme, the 4G network and an electronic device need to be significantly changed.

Various embodiments of the disclosure may provide an electronic device supporting a 4G network and a 5G network with a relatively small change and may propose an electronic device and a network of an interworking scheme providing an efficient data service between the 4G network and the 5G network through a small change in the network.

Embodiments of the disclosure may provide an electronic device providing a stable data service through the interworking between the 4G network and the 5G network and a method therefor.

Technical Solution

According to an embodiment of the disclosure, an electronic device may include a first modem supporting communication for a first cellular network, a second modem supporting communication for a second cellular network, a processor electrically coupled to the first modem and the second modem, and a memory electrically coupled to the processor and including instructions.

According to an embodiment, the instructions, when executed by the processor, may cause the processor to perform an operation associated with a radio interface layer (RIL) corresponding to both the first modem and the second modem, and to acquire control information generated by the second modem via a control path connecting the first modem and the RIL.

According to an embodiment of the disclosure, an electronic device may include a first wireless communication modem configured to provide first wireless communication with a first frequency range, a second wireless communication modem configured to provide second wireless communication with a second frequency range higher than the first frequency range, wherein the second wireless communication modem is configured to exchange control information with the first wireless communication modem, a processor operatively coupled to the first wireless communication modem and the second wireless communication modem, and a memory operatively coupled to the processor and including instructions. The instructions, when executed by the processor, may cause the processor to provide a radio interface layer (RIL) configured to form a first data path with the first wireless communication modem and to form a second data path with the second wireless communication modem, to allow the RIL to directly exchange a first control signal associated with the first wireless communication modem with the first wireless communication modem, and to allow the RIL to exchange a second control signal associated with the second wireless communication modem via the first wireless communication modem.

According to an embodiment of the disclosure, an electronic device may include a first wireless communication modem configured to provide first wireless communication with a first frequency range, a second wireless communication modem configured to provide second wireless communication with a second frequency range at least partially identical to or higher than the first frequency range, wherein the second wireless communication modem is configured to exchange control information with the first wireless communication modem, a processor operatively coupled to the first wireless communication modem and the second wireless communication modem, and a memory operatively coupled to the processor and including instructions.

According to an embodiment, the instructions, when executed by the processor, may cause the processor to provide a radio interface layer (RIL) configured to form a first data path with the first wireless communication modem and to form a second data path with the second wireless communication modem, to allow the RIL to directly exchange a first control signal associated with the first wireless communication modem with the first wireless communication modem, and to allow the RIL to exchange a second control signal associated with the second wireless communication modem via the first wireless communication modem.

Advantageous Effects

According to embodiments of the disclosure, an electronic device may stably receive data upon change of a network providing a service.

According to an embodiment, the electronic device may perform 4G-5G interworking and may provide a seamless service between 4G and 5G without using an existing inter radio access technology (IRAT) handover scheme, thus optimizing the performance.

Besides, a variety of effects directly or indirectly understood through this disclosure may be provided.

MODE FOR INVENTION

Figure 1:
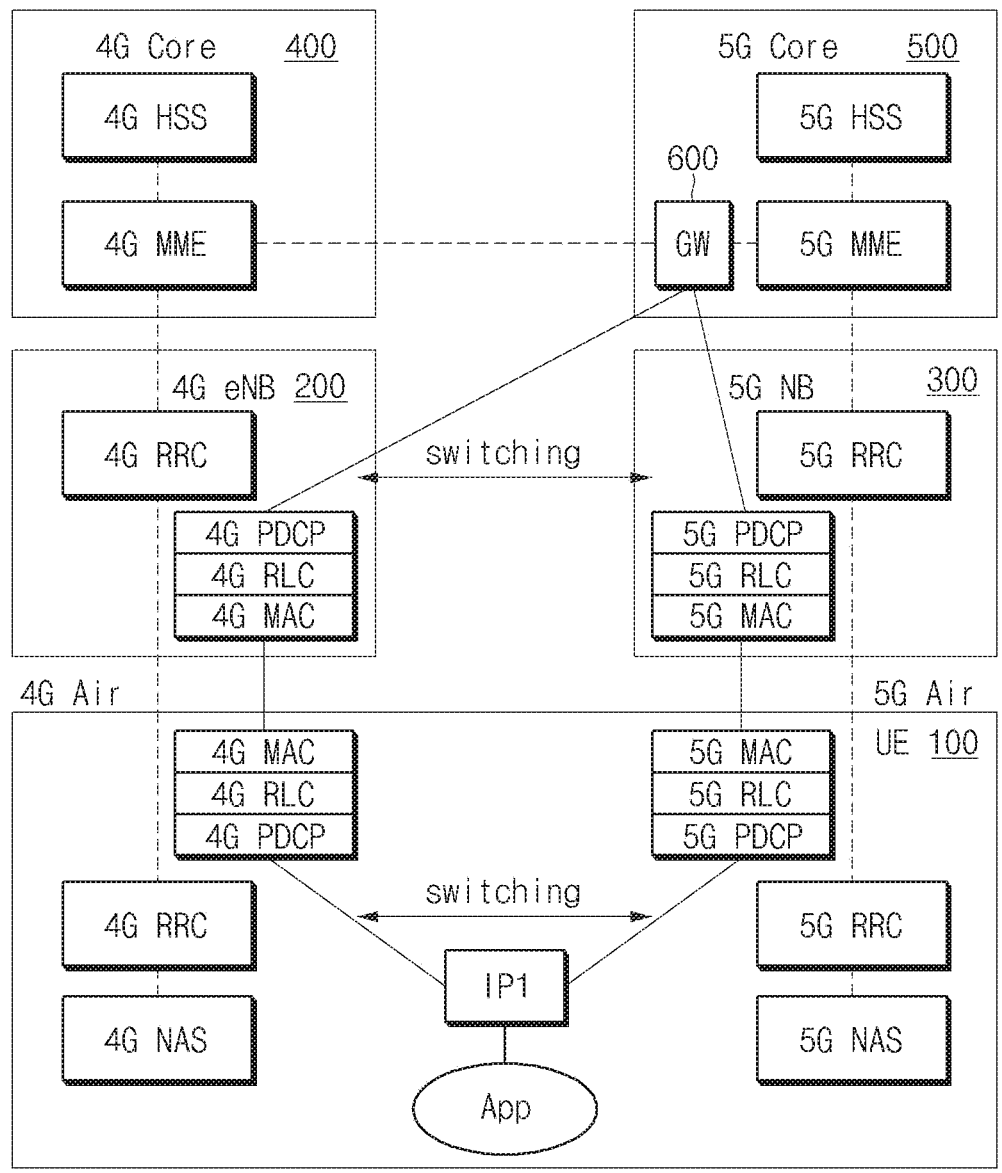
FIG. 1 illustrates a network environment of an electronic device according to an embodiment.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure. With regard to description of drawings, similar components may be marked by similar reference numerals.

Prior to describing an embodiment of the disclosure, a network environment to which the embodiment of the disclosure is applicable is described. Various embodiments of the disclosure may be applied to a data service supporting 5G network communication. In some cases, embodiments of the disclosure may not be applied to an IP multimedia system (IMS) such as a voice over LTE (VoLTE).

1. Network Environment 1.1 Network Environment for 4G-5G Interworking

FIG. 1 illustrates a network environment of an electronic device according to an embodiment.

According to an embodiment, user equipment (UE) 100 may support 4G network and 5G network communication. In an embodiment below, an UE may be referred to as an "electronic device". According to an embodiment, the 4G network and the 5G network may perform interworking. According to an embodiment, in 4G and 5G, a radio access network (RAN) and a core network may be independently implemented, and authentication-related equipment may also be independently operated. According to an embodiment, a GW 600 may include a switch, a 4G GW, and/or a 5G GW. In the case where the 4G GW is operated in a 4G core network 400, the GW 600 may be in a state of being connected with the 4G GW. Accordingly, even though the electronic device 100 accesses a 4G eNB 200, the electronic device 100 may access the 5G GW present in a 5G core network 500. In the description below, for convenience of description, the 4G GW or the 5G GW may be referred to as the "GW 600", the 4G core network 400 may be referred to as a "4G core 400", and the 5G core network 50 may be referred to as a "5G core 500".

To this end, a network architecture according to various embodiments of the disclosure may include the 4G core 400, the 4G network including the 4G eNB (eNode B) 200, the 5G core 500, the 5G network including a 5G NB 300, and the electronic device 100.

According to an embodiment, the 4G core 400 may include a mobility management entity (MME) that manages a 4G communication protocol based network mobility and generates an evolved packet system (EPS) bearer, and a home subscriber server (HSS) that stores authentication information of the electronic device 100 and sends the authentication information to the MME. Although not illustrated, the 4G core 400 may include the 4G GW, for example, a P-GW or S-GW.

According to an embodiment, the 5G core 500 may include an MME and an HSS that are based on a 5G communication protocol. A network function module that performs MME and HSS functions in the 5G communication protocol may be called "various names". The 5G core 500 may include the GW 600 supporting the interworking between the 4G network and the 5G network. The case where the GW 600 is included in the 5G core 500 is illustrated in FIG. 1, but the GW 600 may be placed outside the 5G core 500.

According to an embodiment, the GW 600 may act as a serving gateway (S-GW) and a packet gateway (P-GW). The electronic device 100 may access the GW 600 to transmit/receive data. The GW 600 may act as an anchor in a handover between the 4G eNB 200 and the 5G NB 300. According to an embodiment, the GW 600 may allocate the same IP address (e.g., IP1 of FIG. 1) to 4G and 5G data paths for continuity of a data service between 4G and 5G. For example, the GW 600 may allocate an IP address through a terminal access procedure complying with the communication protocol such as 3GPP. The GW 600 may allocate the same IP address to a 4G Internet public data network (PDN) and a 5G Internet PDN. In this case, the 4G data path and the 5G data path may be handled as the same path in an external Internet network.

According to an embodiment, even though the electronic device 100 accesses the 4G eNB 200, the electronic device 100 may access the GW 600 present in the 5G core 500. To this end, the 4G MME may determine whether the electronic device 100 thus accessed is a 5G electronic device supporting 5G; in the case of the 5G electronic device supporting 5G, the 4G MME may select the GW 600. When the electronic device 100 is an electronic device supporting only 4G, the 4G MME may select the 4G GW (not illustrated) and may connect the 4G GW with the 4G eNB 200. In FIG. 1, According to an embodiment, in the case of transmitting or receiving a signal via the 4G network, the electronic device 100 may transmit/receive the signal via the 4G eNB 200 and the GW 600. In the case of transmitting/receiving a signal via the 5G network, the electronic device 100 may transmit/receive the signal via the 5G NB 300 and the GW 600.

According to an embodiment, the 4G eNB 200 may be a base station supporting 4G network communication. The 4G eNB 200 may provide wireless connection between the electronic device 100 and the 4G network. The 4G eNB 200 may be implemented in compliance with the 4G standard. For example, the 4G eNB 200 may support radio resource control (RRC), packet data convergence protocol (PDCP), radio link control (RLC), medium access control (MAC) layers. Although not illustrated in FIG. 1, an eNB may support a physical (PHY) layer. The eNB may be replaced with various expressions such as a base station, an NB, a node, and the like.

According to an embodiment, a 5G radio access network (RAN) may include the 5G NB 300. According to an embodiment, the 5G NB 300 may be a base station supporting 5G network communication. The 5G NB 300 may support RRC, PDCP, and RLC layers. The 5G NB 300 may provide wireless connection between the electronic device 100 and the 5G network. According to an embodiment, the NB may be replaced with various expressions such as an eNB, a base station, a node, and the like. The 5G NB 300 may support MAC and PHY layers. A range that is allocated for a base station to provide a service may be called a "cell", and the 5G NB 300 may configure a cell and may provide a 5G network communication service to electronic devices in the cell.

According to an embodiment, the 5G network and the electronic device 100 may support a handover between 5G cells. The handover between 5G cells may operate independently of the 4G network.

According to an embodiment, the electronic device may determine whether to perform a 5G communication service based on a public land mobile network (PLMN) and a tracking area (TA) of the 4G eNB 200. The electronic device 100 may determine a 5G venue by using the PLMN and TA sent from the 4G eNB 200 and may control an on/off of a 5G modem.

According to an embodiment, the electronic device 100 may be an electronic device (hereinafter referred to as a "5G electronic device") supporting the 5G network. An electronic device supporting only 5G network communication or an electronic device supporting both 4G network communication and 5G network communication may be included in the 5G electronic device. The electronic device 100 disclosed in the specification may support both 4G and 5G. According to an embodiment, the electronic device 100 may perform a 4G-5G interworking operation.

According to an embodiment, the electronic device 100 wirelessly accesses the 4G eNB 200 and may transmit/receive packets via the 4G core 400. The electronic device 100 may wirelessly access the 5G NB 300 and may transmit/receive packets via the 5G core 500.

According to an embodiment, the electronic device 100 may execute an application and may select a data transmission/reception path between 4G or 5G networks so as to transmit/receive application-related data via the 4G network or the 5G network. The GW 600 may select the data transmission/reception path between the 4G network and the 5G network on a core network.

According to an embodiment, the electronic device 100 may support 4G and 5G standards. For example, the electronic device 100 may support radio resource control (RRC), packet data convergence protocol (PDCP), radio link control (RLC), medium access control (MAC) layers.

According to an embodiment, a radio bearer may be configured to provide a data transmission service between the electronic device 100 and a network. The radio resource control (RRC) layer may perform a function associated with configuration, re-configuration, or release of the radio bearer. The RRC layer may manage paging message transmission/reception or may send system information to the electronic device 100 in the cell. The RRC layer may perform wireless connection and mobility management.

According to an embodiment, after searching for an appropriate cell, the electronic device 100 may establishes an RRC connection in the corresponding cell and may register information of an electronic device at the core network. Afterwards, the electronic device 100 may stay in an RRC idle state. In the case where the electronic device 100 staying in the RRC idle state needs to establish the RRC connection, the electronic device 100 may establish a connection with the RRC of the network through an RRC connection procedure and may transition to an RRC connected state.

According to an embodiment, a non-access stratum (NAS) layer of the electronic device 100 may perform functions of session management, mobility management, and the like. The NAS layer may perform functions such as default bearer management and dedicated bearer management. The electronic device 100 may take charge of control by using a packet service from the network. Upon initial attach to a specific packet data network PDN, a default bearer resource may be allocated from the network when attached to the network. The network may allocate an Internet protocol (IP) address, which the electronic device 100 can use, such that the electronic device 100 can use a data service. The network may allocate a quality of service (QoS) to an electronic device. A bearer that is allocated to an electronic device by the network may be referred to as an "evolved packet service (EPS)".

According to an embodiment, the packet data convergence protocol (PDCP) layer may compress a packet of IP data or may cipher a control message and user data. The PDCP layer may perform a function of protecting the integrity of data or preventing a data loss during a handover.

According to an embodiment, the radio link control (RLC) layer may adjust a size of a packet sent from the PDCP layer and may send the packet to the medium access control (MAC) layer. According to an embodiment, the MAC layer may perform multiplexing, uplink/downlink scheduling, and the like between channels.

According to an embodiment, the electronic device 100 may include a 4G modem, a 5G modem, and a processor (e.g., an application processor (AP)). The 4G modem and the 5G modem of the electronic device 100 that supports the standalone (SA) scheme may be independently coupled to the AP. Various embodiments of the disclosure may operate in the SA scheme to support the interworking. The electronic device 100 of the SA scheme to support the interworking may operate in two schemes below.

According to an embodiment, like a dual sim dual standby (DSDS) electronic device, the electronic device 100 may perform data switching at the AP while operating a radio interface layer (RIL) for each of 4G and 5G at the AP. In this case, a switching time of about several hundreds msec may be taken, a lot of data loss may occur in switching, and there may be a problem in usability.

According to an embodiment, the electronic device 100 may operate in a non standalone (NSA) based scheme. The AP (e.g., an RIL) may recognize the 4G and 5G modems as one single modem. In this case, the modems may perform data switching and may inform the AP of the data switching. In this case, a switching speed of a data path may become higher. However, communication between the modems may be necessary.

In FIG. 1 and embodiments below, the interworking between heterogeneous networks will be described with respect to the interworking between 4G and 5G network communication, but embodiments to be described below may be applied to the interworking between various heterogeneous network communication. For example, embodiments to be described below may be applied to the interworking between 3G and 4G network communication.

1.2. Network Operation

Below, various operations of the electronic device 100 and the network for 4G and 5G interworking will be described by using the network architecture of FIG. 1.

1) According to an embodiment, because 4G and 5G core networks exist independently of each other, the electronic device 100 may perform attach, authentication, and PDN connection procedures on each of the 4G network and the 5G network. For the interworking, the electronic device 100 may use the same identification (ID) (or an IP multimedia services identity module (ISIM)) in the 4G and 5G networks. A secure circuit or a secure element (e.g., a subscriber identity module (SIM) (not illustrated)) of the electronic device 100 may be used for each of 4G and 5G. In this case, 4G and 5G SIM profiles may be identical. A SIM slot may be coupled to the 4G modem. According to an embodiment, the 5G modem may access a SIM card via the 4G modem.

2) According to an embodiment, when the electronic device 100 is turned on, the electronic device 100 may search for the 4G network and may perform a procedure for 4G network attach and PDN connection. The electronic device 100 may check the 4G PLMN and the TA in a state of accessing the 4G network. In the case where the 4G PLMN and the TA are a PLMN and a TA associated with 5G, according to an embodiment, the 5G modem may be turned on. The 5G modem may periodically search for the 5G network; when succeeding in 5G network acquisition, the 5G modem may perform a procedure for 5G attach and PDN connection.

3) According to an embodiment, the interworking may be performed based on the 4G network. For example, a data service may start from the 4G network; when the 5G network is available in a 4G RRC connected state, an electronic device may switch to the 5G network; when the 5G network is not available, the electronic device may fall back to the 4G network. To improve switching performance, the electronic device 100 may maintain the connection with the 4G network even while performing 5G communication. In the case where the 4G network is not available (e.g., in the case where there is no service, in the case of connection failure/rejection, or the like), the data service may be stopped even though the 5G network is available. According to an embodiment, the 5G data connection may be maintained even when the 4G network becomes unavailable during the 5G communication; however, in a 4G-based communication system, the 5G data connection may be released when the 4G communication becomes unavailable. According to an embodiment, the electronic device 100 may be difficult to release the RRC connection with the 5G network. The electronic device 100 may maintain the 5G data service until the RRC connection is released. According to an embodiment, the 5G electronic device 100 may operate at least one PDN of an Internet PDN, a 4G signaling PDN, or a 5G signaling PDN. The Internet PDN may generate the 4G Internet PDN and the 5G Internet PDN via the electronic device 100 and the 4G and 5G networks, respectively. Only one of two PDNs may be selectively used depending on a condition during data communication, and the PDN thus selectively used may be collectively referred to as an "Internet PDN".

According to an embodiment, the 5G electronic device may generate the 4G Internet PDN and the 4G signaling PDN when accessing the 4G network. The 4G signaling PDN may generate a PDN regardless of whether to enter a 5G cell. The 5G electronic device may generate the 5G Internet PDN and the 5G signaling PDN when accessing the 5G network. According to an embodiment, the 4G Internet PDN may correspond to the 4G data path below, and the 5G Internet PDN may correspond to the 5G data path below.

5) According to an embodiment, with regard to the same electronic device, the GW 600 may allocate the same IP address to the 4G Internet PDN and the 5G Internet PDN for data interworking. Upon data communication, the GW 600 may selectively use one of two PDNs according to various embodiments of the disclosure. For example, one of two PDNs may be selectively used depending on a switching notification of the electronic device 100. The electronic device 100 may not transmit/receive data at the same time by using the 4G and 5G Internet PDNs.

6) According to an embodiment, the electronic device 100 may set up a data connection via the 4G network when a mobile orientation (MO) call or a mobile termination (MT) call occurs. For example, when data to be transmitted to the electronic device 100 upon occurrence of the MT call reach the GW 600, the GW 600 may send a downlink data notification to the 4G MME, and the 4G MME may send a paging signal to the electronic device 100 via the 4G eNB 200. In the case of the MO data call, the electronic device 100 may set up a 4G data connection.

7) According to an embodiment, 4G-5G data path switching may be performed based on the electronic device 100. For example, the electronic device 100 may determine a wireless state to determine whether to switch. When the electronic device 100 determines the switching, the electronic device 100 may send a switching notification message to the GW 600 for synchronization with a switching anchor and may switch a data path in the electronic device 100.

8) According to an embodiment, the switching notification message may be sent between the GW 600 and the electronic device 100 via the signaling PDN. The switching notification message may be sent by using an IP packet. To reduce the revision of an existing 4G network, with regard to switching, a new message may be defined using the signaling PDN without adding new control signaling, and the message may be sent by using the IP packet. An operation and a definition associated with the switching notification message will be described below.

9) According to an embodiment, it may be assumed that, in the SA scheme based on the interworking, the 4G network is in an available state and 5G network status dynamically varies. According to an embodiment, the electronic device 100 may periodically determine whether the 5G network is available in the 4G RRC connected state. The electronic device 100 may monitor the 5G network based on whether the 4G RRC connection is made, regardless of whether the data communication is made.

According to another embodiment, the electronic device 100 may monitor the 5G network on a data service basis. When the electronic device 100 always monitors the 5G network in a 4G RRC disconnected state, the case where there is an unnecessary attempt on a 5G network connection may occur.

10) According to an embodiment, when the 5G network status satisfies a switching condition in the 4G connected state, the electronic device 100 may send a service request and may attempt a 5G data connection. After a 5G data bearer is normally completely set up, the electronic device 100 may send a 4G-to-5G switching notification message to the GW 600. The electronic device 100 may send the switching notification message to the GW 600 via the 5G signaling PDN and may switch the data path even in the electronic device 100. For example, the electronic device 100 may change the data path from 4G to 5G.

According to an embodiment, when the GW 600 receives the switching notification message, the GW 600 may change a data path (or a link) from the 4G Internet PDN to the 5G Internet PDN. In this case, because a switching time is not accurately synchronized between the core network and the electronic device 100 and there is no data forwarding function between the 4G network and the 5G network, a data loss may occur upon switching. However, because the electronic device 100 is capable of providing a data service via the 4G network even while setting up a 5G data bearer, the electronic device 100 may reduce a switching gap or a data loss.

11) According to an embodiment, in the case wherein 5G-to-4G switching is performed, the electronic device 100 may determine whether to switch based on the 5G network status. When the 5G network status satisfies the switching condition, the electronic device 100 may change a data path from a 5G modem 123 to a 4G modem 121 and may send a 5G-to-4G switching notification message to the GW 600 via the 4G signaling PDN.

According to an embodiment, when the GW 600 receives the switching notification message, the GW 600 may change a data path from the previous 5G Internet PDN to the 4G Internet PDN. The data path may switch to 4G mostly in the case where there is a problem in 5G communication; because there is already a problem in data transmission/reception, there may be required the fallback to the 4G network as soon as possible. According to an embodiment, in the case where a time of about 130 to 200 msec is required to set up the 4G data connection, to set up the 4G data connection after determining the 4G fallback may cause a problem in the use of a user.

12) According to an embodiment, to reduce a 4G fallback time, the electronic device 100 may maintain the connection with the 4G network even in a situation of transmitting/receiving data via the 5G network. According to an embodiment, the GW 600 may send a dummy packet for the purpose of maintaining the connection with the 4G network. Because it is difficult to maintain the 4G RRC connection in a situation where there are no transmission/reception data, a dummy packet may be utilized.

According to an embodiment, when the GW 600 receives the switching notification message indicating 4G-to-5G switching, the GW 600 may start to send a dummy packet via the 4G network. According to an embodiment, when the GW 600 receives the switching notification message indicating 5G-to-4G switching, the GW 600 may stop sending the dummy packet.

According to an embodiment, for the connection with the 4G network, the GW 600 may periodically send a dummy packet. The GW 600 may send the dummy packet to the electronic device 100 via the 4G signaling PDN.

13) According to an embodiment, after performing data switching from 5G to 4G, the electronic device 100 may not release a 5G RRC connection. Because the GW 600 does not send data any more, the 5G NB 300 may release the connection when an RRC deactivation timer expires, or the connection may be released as a channel state becomes bad. For example, the RRC connection may be released due to a radio link failure (RLF).

According to an embodiment, the electronic device 100 may operate a timer for the purpose of preventing 4G-5G ping-pong and may allow switching to 5G to be possible after a given time elapses from the fallback to the 4G Immediately after falling back to 4G, the electronic device 100 may not switch to 5G during 4G data communication even though the 5G channel again becomes good. In this case, the RRC connection with 5G may be released depending on the RRC deactivation timer.

15) According to an embodiment, a 4G-5G switching condition may be determined based on a parameter such as a received signal state and/or a data reception rate. The 4G-5G switching condition may be determined later.

16) According to an embodiment, in a state of a data service via the 5G network, when the data service is completed, the electronic device 100 may switch to a 4G service. When the data service via the 5G network is completed, the 5G RRC connection may be normally released, and the electronic device 100 may send a 5G-to-4G switching notification message to the GW 600 via the 4G signaling PDN. To send the switching notification message in a state where the data service is completed may be for the 4G fallback of a 5G GW mode or for releasing the 4G RRC connection by stopping sending the dummy packet for maintaining the 4G connection. According to an embodiment, the GW 600 may detect the release of the 5G data connection and may switch a data path to 4G, but the electronic device 100 may perform the above operation for the purpose of reducing the complexity of implementation.

17) According to an embodiment, a reception confirm response ACK to the switching notification message may not be sent between the electronic device 100 and the GW 600. To cope with the case where the GW 600 fails in reception of a message, the electronic device 100 may resend the switching notification message at given intervals during a given time.

18) According to an embodiment, because current consumption of the electronic device 100 increases in the case of maintaining the 4G RRC connection during 5G communication, a connected mode DRX (CDRX) may be used. Because the electronic device 100 is capable of performing transmission even in a CDRX deactivation period, the electronic device 100 may reduce current consumption while reducing the revision of the 4G system, by using a CDRX cycle that is used at the 4G eNB 200.

19) According to various embodiments of the disclosure, in the case where one cellular communication is unstable, a stable IRAT handover may be performed for seamless reception of data. According to embodiments of the disclosure, the handover between the 4G network and the 5G network may be performed with a small change in an electronic device and a network, and a seamless service may be provided.

According to an embodiment, a handover procedure may be performed between 5G cells. The handover may be performed in various cases where a communication situation of a cell is bad. For example, the handover between 5G cells may be performed as follows.

According to an embodiment, events for a measurement report may be defined in the standard document. The 5G electronic device may send a measurement report to the 5G NB. After the 5G NB receives the measurement report, based on the corresponding contents, the 5G NB may designate a specific target cell to which the electronic device will hand over or may send a handover-possible target cell list to the electronic device. The electronic device may select the designated target cell or one cell of the target cell list and may access the selected cell. The electronic device may send an RRC setup message and may complete the handover procedure.

According to an embodiment, a 5G signal may be transmitted/received, for example, in a 28 GHz frequency band, and a signal quality of the 5G signal may quickly change due to a characteristic of a high frequency (mmWave) of 28 GHz as the electronic device moves or an ambient environment of the electronic device changes. Because the quality of the 5G signal is in a decreased state at a time when a measurement report event occurs, a failure rate associated with transmitting/receiving an RRC message for the handover procedure at the corresponding time may be higher than in an existing commercial network.

According to an embodiment, to make a handover success rate high, in a state where a channel is good immediately after the electronic device is successfully handed over to the target cell, the 5G network may send, to the electronic device, a list of peripheral candidate cells to which the electronic device is capable of handing over. Before receiving the measurement report, in advance, the electronic device may send a handover target cell list. Afterwards, in the case where a state of a peripheral cell is fluctuated, a new cell list may be sent to the electronic device. The electronic device may perform measurement depending on a measurement scenario; when a measurement event occurs or a given handover condition is satisfied, without sending the measurement report to the 5G network, the electronic device may select an optimum cell of the handover target cell list previously received and may perform a handover. The electronic device may reduce a handover failure due to a failure of the signaling with the 5G NB, based on the handover target cell list previously received. However, according to the above scheme, because the electronic device configures a handover cell list without a measurement report, compared to an existing scheme, the amount of data of a control plane may increase due to an increase in the number of lists, and there may be the burden that the 5G NB consistently seizes the availability of each cell and updates a list so as to be sent to the electronic device if necessary.

Various embodiments of the disclosure may be available in the case where there is no paging signal associated with one cellular communication of two cellular communication. For example, in the case where there is no paging signal associated with 5G communication, the electronic device 100 may determine whether to perform 5G communication by using the 4G network. For example, the electronic device 100 may receive a paging signal via the 4G network and may transmit/receive data via the 5G network depending on a 5G network situation. In the case where there is no paging signal, in general, in the case of the electronic device 100, a mobile termination (MT) call may be impossible, and to receive a notification (e.g., an SMS message) that is sent from an application server to the electronic device 100 may be impossible or may be delayed. According to embodiments of the disclosure, the MT call and SMS reception may be possible via the 4G network.

Figure 2:
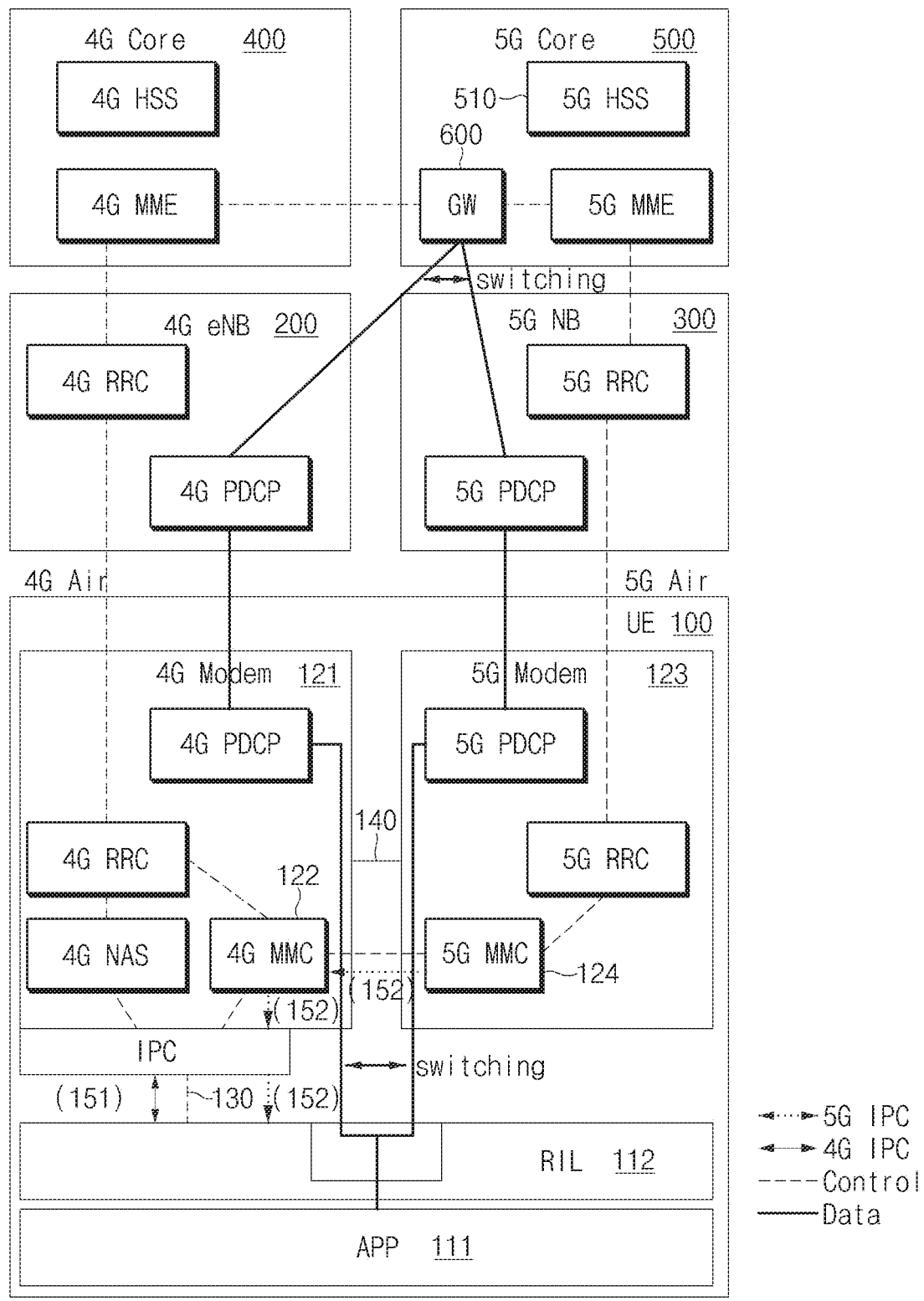
FIG. 2 illustrates a mutual architecture between wireless communication systems according to an embodiment.

2. 4G-5G Interworking System Architecture
2.1. Architecture of Communication System FIG. 2 illustrates a mutual architecture between wireless communication systems according to an embodiment.

According to an embodiment, a wireless communication system disclosed in the specification may include the 4G core 400, the 5G core 500, the 4G eNB 200, the 5G NB 300, and the electronic device 100. Each component of FIG. 2 may be identical or similar to each component of FIG. 1. Thus, additional description will be omitted to avoid redundancy.

According to an embodiment, the electronic device 100 may include the 4G modem 121 supporting 4G network communication and the 5G modem 123 supporting 5G network communication and may store a radio interface layer (RIL) 112 and an application (APP) 111. According to an embodiment, the RIL 112 and the application 111 may be stored in a memory (e.g., a memory 120 of FIG. 4). An operation associated with the RIL 112 and the application 111 may be executed by a processor (e.g., a processor 110 of FIG. 4). The processor may be an application processor (AP). Each of the 4G modem 121 and the 5G modem 123 may include a communication processor (CP). According to an embodiment, the 4G modem 121 (and the CP) may be disposed on the same application processor (AP) system on chip (SoC) as the processor (e.g., a processor 430 of FIG. 4).

According to an embodiment, the electronic device 100 may send data associated with the application 111 to the 4G modem 121 or the 5G modem 123 via one RIL 112. The 4G modem 121 and the 5G modem 123 may be operatively or communicatively coupled to the RIL 112.

According to an embodiment, each of the 4G modem 121 and the 5G modem 123 may be coupled to the RIL 112 via a data path. According to an embodiment, the electronic device 100 may be based on the single RIL 112 with respect to the 4G modem 121 and the 5G modem 123. The 4G modem 121 and the 5G modem 123 may share a portion of a data path. The 4G modem 121 and the 5G modem 123 may share at least a partial data path in the RIL 112.

According to an embodiment, via the 4G modem 121 or the 5G modem 123, the electronic device 100 may send data to a network or may receive data from the network. The electronic device 100 may send or receive data by selectively using the 4G modem 121 or the 5G modem 123. The electronic device 100 may selectively use the 4G data path or the 5G data path.

According to an embodiment, for switching between the 4G data path and the 5G data path, the electronic device 100 may receive control information about the 5G modem 123 from the 5G modem 123. In this case, the control information may be sent via a control path in the electronic device 100. According to an embodiment, the control information may include at least one of a 5G network state, a state (e.g., an on/off) of the 5G modem 123, or a 5G network connected state.

According to an embodiment, the electronic device 100 may acquire control information about the 4G modem 121 from the 4G modem 121 via the control path. The control information about the 4G modem 121 may include at least one of a 4G network state, a 4G network connected state, or a state of the 4G modem 121.

According to an embodiment, the control path may be a 5G control path through which the control information about the 4G modem 121 and the control information about the 5G modem 123 are transferred. According to an embodiment, the 4G control path may be formed between the 4G RRC, the 4G NAS, the IPC, the RIL 112, and the processor (e.g., the processor 430 of FIG. 4). The 5G control path may be formed between the 5G RRC, a 5G MMC 124, a 4G MMC 122, the IPC, the RIL 112, and the processor.

According to an embodiment, only one control path may be established between the RIL 112 and modems. In other words, the 4G control path and the 5G control path may share one control path between the RIL 112 and a modem. Referring to FIG. 2, the control path may be established between the 4G modem 121 and the RIL 112. Because there is no direct control path between the 5G modem 123 and the RIL 112, the control information about the 5G modem 123 may be sent via the 4G modem 121. The control information about the 4G modem 121 may be directly sent from the 4G modem 121 to the RIL 112. To send the control information, the 4G modem 121 and the 5G modem 123 may mutually perform interworking. For example, the 4G modem 121 and the 5G modem 123 may exchange signals with each other via a hardware interface 140.

According to an embodiment, the control path may be a path through which the control information about the 5G modem 123 and/or the control information about the 4G modem 121 are sent to the RIL 112. According to an embodiment, the control path may be a path that is connected from the 4G modem 121 to the RIL 112. The electronic device 100 may transmit/receive a message of an inter processor communication (IPC) format via the control path.

According to an embodiment, the 4G control path may correspond to a 4G IPC path 151, and the 5G control path may correspond to a 5G IPC path 152. For example, the 4G IPC path 151 may be formed between the 4G RRC, the 4G NAS, the IPC, the RIL 112, and the processor (e.g., the processor 430 of FIG. 4) (e.g., an AP), and the 5G IPC path 152 may be formed between the 5G RRC, the 5G MMC 124, the 4G MMC 122, the IPC, the RIL 112, and the processor.

According to an embodiment, the 4G IPC path 151 between the 4G modem 121 and the RIL 112 may be a physical channel 130. The 5G IPC path 152 between the 4G modem 121 and the RIL 112 may be formed via the 4G IPC path 151 and the physical channel 130. In other words, a 5G IPC message (e.g., 5G control information) may be sent to the processor via the 4G IPC path (151, 130). For example, the 4G modem 121 may load a 5G IPC message received from the 5G modem 123 onto the path (151, 130) of a 4G IPC message so as to be sent to the processor (and the RIL 112). For example, the processor may recognize the 5G IPC message and the 4G IPC message as a message of the same logical channel (not illustrated). The 4G IPC path 151 and the 5G IPC path 152 are illustrated in FIG. 2 to be independent of each other but may be actually one logical channel (not illustrated).

According to an embodiment, the electronic device 100 may process the 5G IPC message without distinction to the 4G IPC message.

According to an embodiment, the 4G-5G interworking may be performed between modems in terms of the electronic device 100. To this end, the 4G modem 121 and/or the 5G modem 123 may be coupled to each other via the hardware interface 140 and may include the multi-mode controller (MMC) 122 and the MMC 124, respectively.

2.1.1 MMC

According to an embodiment, the 4G modem 121 and the 5G modem 123 may be connected to the physical interface 140 (or a hardware interface) for the purpose of controlling an interworking operation or exchanging information with each other. The 4G MMC 122 and/or the 5G MMC 124 may control the hardware so as to process information acquired via the interface or send information via the hardware interface.

According to an embodiment, the 4G MMC 122 and the 5G MMC 124 may exchange information with each other. According to an embodiment, the information that is exchanged between the 4G MMC 122 and the 5G MMC 124 may be control information including RRC connection information, a switching message, and inter processor communication (IPC) or information necessary for interworking. The IPC may be a communication protocol between an AP and a CP.

According to an embodiment, the data path or the control path may be established between the RIL 112 and the 4G modem 121 and/or the 5G modem 123. According to an embodiment, the RIL 112 may form the data path with the 4G modem 121 and may form the data path with the 5G modem 123. The RIL 112 may form the control path with the 4G modem 121.

According to an embodiment, the 4G MMC 122 may exchange the control information about the 5G modem 123 with the RIL 112 via the control path. According to an embodiment, the 4G MMC 122 may exchange control signals with the 5G MMC 124 via the hardware interface 140 disposed between the 4G modem 121 and the 5G modem 123.

According to an embodiment, the 4G modem 121 and the 5G modem 123 may perform inter-communication via the hardware interface 140. The 4G MMC 122 and the 5G MMC 124 may perform communication via the hardware interface 140 therebetween. For example, the hardware interface 140 may include at least one of a universal asynchronous receiver/transmitter (UART), a high speed UART (HS-UART), an inter integrated circuit (I2C), or a serial peripheral interface bus (SPI).

4.1.2 Control Information and Control Path 4.1.2.1 IPC Path

According to an embodiment, the RIL 112 may perform communication with a CP layer via the IPC of the 4G modem 121. For example, the RIL 112 may perform communication with the 4G modem 121 and the 5G modem 123 via the IPC.

According to an embodiment, the control information about the 5G modem 123 may be sent via the 4G modem 121. The 4G modem 121 may relay information exchange between the 5G modem 123 and the RIL 112. For example, control information generated by the 5G modem 123 may be sent to the RIL 112 via the IPC, and control information generated by the RIL 112 may be sent to the 5G modem 123.

According to an embodiment, in a situation where data communication is performed via the 5G modem 123, only a limited IPC message for data connection may be generated by the 5G MMC 124, and the IPC message may be sent to the RIL 112 via the 4G MMC 122 and the IPC.

Table 1 below illustrates the IPC described above. The detailed format and use method may refer to an IPC document.

TABLE 1

| IPC Name | Purpose | Note |
|---|---|---|
| Net Regi Notification | Send Network registration information | |
| RSSI (received signal strength indication) | Send RSSI level | |

TABLE 1-continued

| IPC Name | Purpose | Note |
| --- | --- | --- |
| Notification GPRS (general packet radio service) Notification | Send Data connection-related information | |
| Switching Notification | Send 4G-5G switching information | |

According to an embodiment, the 4G modem 121 may not send the same IPC messages to the RIL 112 for the purpose of avoiding IPC redundancy while the IPC messages are sent from the 5G modem 123 to the RIL 112. According to an embodiment, IPCs except for the IPC messages mentioned in Table 1 above may be generated and processed by the 4G modem 121. The 5G modem 123 may not generate IPCs except for the IPC messages mentioned in Table 1 above. According to an embodiment, a message associated with the 4G modem 121 may be generated and processed by the 4G modem 121, and a message associated with the 5G modem 123 may be generated and processed by the 5G modem 123.

According to an embodiment, a path through which an IPC message associated with the 5G modem 123 is sent may be referred to as the "5G IPC path 152". Referring to FIG. 2, the 5G IPC path 152 may be connected from the 5G IPC path 152 to the RIL 112 via the 4G modem 121. For example, the 5G IPC path 152 may be formed between the 5G RRC, the 5G MMC 124, the 4G MMC 122, the IPC, the RIL 112, and the processor (e.g., the processor 430 of FIG. 4).

According to an embodiment, a path through which an IPC message associated with the 4G modem 121 is sent may be referred to as the "4G IPC path 151". The 4G IPC path 151 may be formed between the 4G modem 121 and the RIL 112. For example, the 4G IPC path 151 may be formed between the 4G RRC, the 4G NAS, the IPC, the RIL 112, and the processor (e.g., the processor 430 of FIG. 4).

According to an embodiment, the 4G IPC path 151 and the 5G IPC path 152 may share one path between the RIL 112 and the processor. For example, the 4G IPC path 151 and the 5G IPC path 152 may share the one physical channel 130.

2.1.2.2 HS-UART Command

According to an embodiment, high speed universal asynchronous receiver/transmitter (HS-UART) communication may be performed between the 4G MMC 122 and the 5G MMC 124. The 4G MMC 122 and the 5G MMC 124 may exchange information for the interworking by using the HS-UART communication. The 4G MMC 122 and the 5G MMC 124 may be implemented in the form of software or hardware.

According to an embodiment, for the interworking between the 4G modem 121 and the 5G modem 123, the 4G MMC 112 and the 5G MMC 124 may exchange commands with each other by using the HS-UART communication. IPC messages to be described later may be exchanged with the IPC format maintained.

Commands that the 4G modem 121 and the 5G modem 123 according to an embodiment exchange as follows.
1) 5G Attach Status Notification: notify 5G attach situation
2) 4G RRC Status Notification: notify 4G RRC connected state
3) Switching Notification: notify a 4G-to-5G switching/5G-to-4G switching situation 2.1.2.3 Information Update Between Modem and MMC 2.1.2.3.1 Information Update Between 4G Modem and MMC According to an embodiment, the 4G modem 121 may update an RRC connected state to the 4G MMC 122. According to an embodiment, the 4G modem 121 may update the RRC connected state whenever the RRC connected state is changed. Whenever information of the RRC connected state is updated or periodically, the 4G MMC 122 may generate and/or send a 4G RRC notification message (e.g., 4G RRC status notification) to the 5G MMC 124.

2.1.2.3.2 Information Update Between 5G Modem and MMC

According to an embodiment, the 5G modem 123 may update 5G attach status and/or a 5G RRC connected state. Whenever the 5G attach status and/or the 5G RRC connected state is changed, the 5G modem 123 may update the 5G attach status and/or the 5G RRC connected state to the 5G modem 123. According to an embodiment, the 5G modem 123 may update a 5G radio measurement result. The 5G modem 123 may update the 5G radio measurement result, and the 5G MMC 124 may check a switching condition.

According to an embodiment, the electronic device 100 that supports 5G communication may be based on the single RIL 112 corresponding to both the 4G modem 121 and the 5G modem 123. According to an embodiment, the 4G data path through which data communication of the 4G modem 121 is performed and the 5G data path through which data communication of the 5G modem 123 is performed may be open at the same time. In this case, the RIL 112 may be difficult to control the two data paths at the same time.

According to an embodiment, the RIL 112 may not control the data path, but the 5G MMC 124 may perform a control of the 5G data path. The 5G MMC 124 may perform a control operation in a situation where a data path is switched from 4G to 5G. According to an embodiment, the 5G MMC 124 may trigger a service request SR to the 5G MMC 124 and may start a 5G data connection. When the SR is triggered and a data radio bearer DRB is open so that a data connection is completed, the 5G modem 123 may send an SR completed notification message to the 5G MMC 124. The 5G MMC 124 may perform a switching operation in response to the SR completed notification message.

2.1.3 Data Path Control

According to an embodiment, the 5G MMC 124 and the 4G MMC 122 may control a data path of the 4G modem 121 and the 5G modem 123. The 5G MMC 124 and the 4G MMC 122 may generate a switching message, and may switch a data path in the electronic device 100 and/or may control a data path on a network, by using the switching message.

According to an embodiment, the electronic device 100 may transmit/receive user data, for example, data associated with the application 111 via a 4G Internet public data network (PDN). A mobile orientation (MO) or a mobile termination (MT) request of the electronic device 100 may be performed via the 4G Internet PDN.

According to an embodiment, the electronic device 100 may switch a data path between 5G and 4G. For example, when a switching condition to 5G is satisfied, the electronic device 100 may switch a communication service to 5G. According to an embodiment, the electronic device 100 may allow the GW 600 to switch a data path to 5G, and the electronic device 100 may internally switch a data path to 5G.

According to an embodiment, the electronic device 100 may send a switching message to the GW 600, and the GW

600 may switch an Internet PDN path to the 5G Internet PDN in response to the switching message.

According to an embodiment, the electronic device 100 may send the switching message to the RIL 112. A control path may not be formed between the 5G MMC 124 and the RIL 112. The 5G MMC 124 may send the switching message to the RIL 112 via the 4G MMC 122. The 4G MMC 122 may relay information exchange between the 5G MMC 124 and the RIL 112. According to an embodiment, a control path may be formed between the 4G MMC 122 and the RIL 112. The 4G MMC 122 may send a message to the RIL 112 via the IPC 113. When a switching condition to 4G is satisfied, the 4G MMC 122 may send the switching message to the GW 600. The RIL 112 may switch the 5G data path to 4G in response to the switching message.

According to an embodiment, the electronic device 100 may simultaneously perform the sending of the switching message to the network and the sending of the switching message to the RIL 112. Below, the switching message sent to the RIL 112 may be referred to as a "link switching message".

*154 2.2 4G-5G Interworking System PDN

Figure 3:
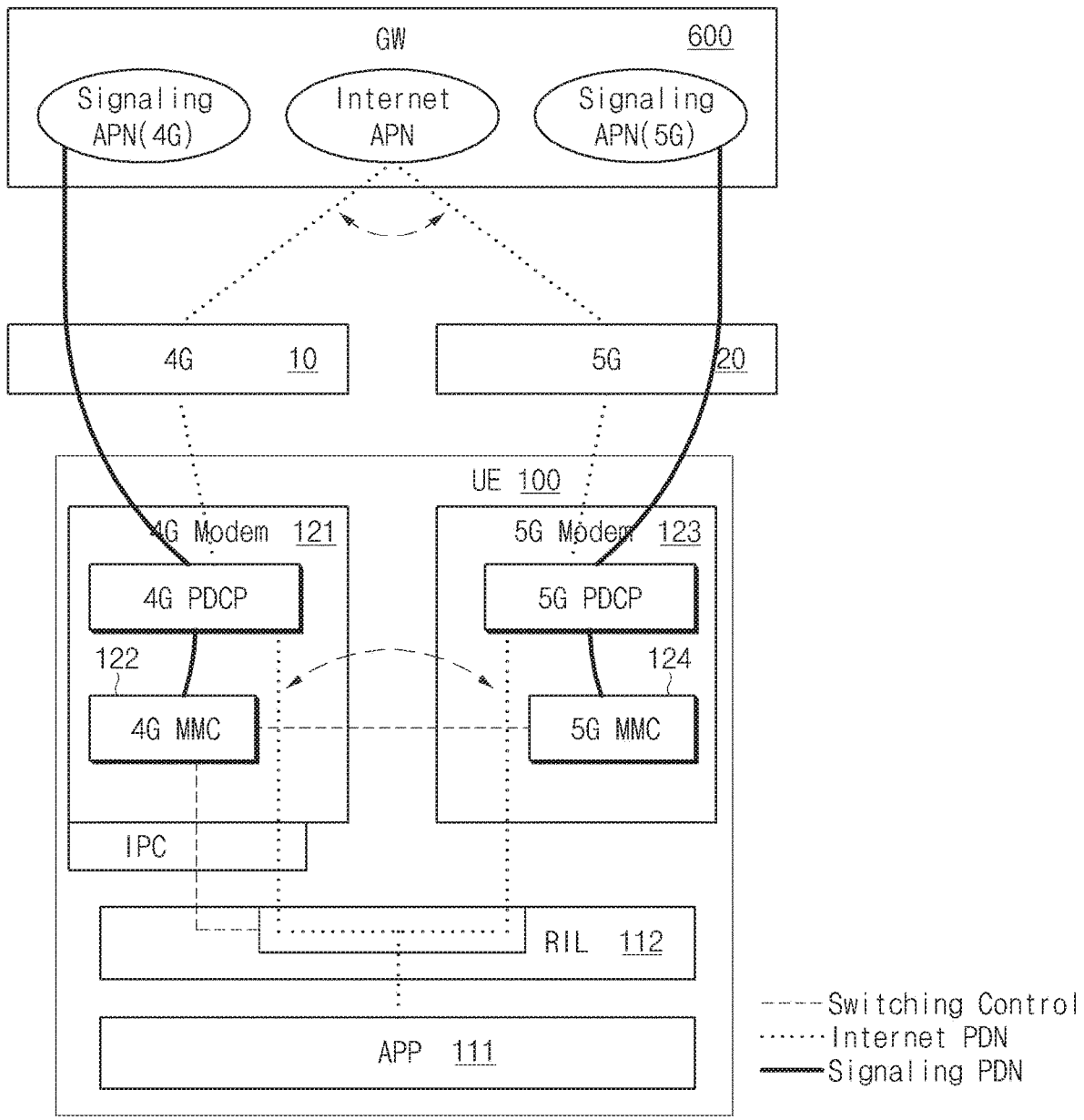
FIG. 3 illustrates a PDN structure of a wireless communication system according to an embodiment.

FIG. 3 illustrates access point names (APNs) that an interworking system according to an embodiment operates.

According to an embodiment, the interworking system may operate a plurality of PDNs. For example, the interworking system may generate and operate three PDNs including the 4G signaling PDN, the 5G signaling PDN, and the Internet PDN. The PDN may be an identifier of an APN. In the following description, the PDN may indicate a specific APN identified by the PDN.

According to an embodiment, the electronic device 100 may respectively generate the 4G Internet PDN and the 5G Internet PDN via the GW 600 and may perform data communication via one PDN selected from the two PDNs depending on a switching condition.

According to an embodiment, the electronic device 100 may generate the 4G Internet PDN and the 4G signaling PDN upon an access to the 4G network. The 4G signaling PDN may be generated regardless of whether to enter a 5G cell. For example, upon an access to the 4G network, the electronic device 100 may generate the 4G signaling PDN at the same time with the 4G Internet PDN.

According to an embodiment, like the access to the 4G, the electronic device 100 may generate the 5G signaling PDN and the 5G Internet PDN upon an access to the 5G. The 4G Internet PDN and the 5G Internet PDN may be collectively referred to as an "Internet PDN".

According to an embodiment, the electronic device 100 may generate the 4G-5G link switching message and may send the link switching message to the GW 600 (e.g., the GW 600 of FIG. 2) via each of the 4G and 5G signaling PDNs. The GW 600 may perform 4G-5G PDN switching by using the link switching message as a start marker. For example, when the switching message is received, the GW 600 may perform the 4G-5G PDN switching. The link switching message may be sent by using an IP packet.

As described with reference to scenario 12 of FIG. 1 above, in the case where a 5G communication situation is not appropriate for transmitting/receiving data or a problem occurs, to minimize a time necessary for the 4G fallback, the electronic device 100 may maintain the RRC connection with the 4G network even in a situation where data are transmitted/received via the 5G Internet. To this end, the GW 600 may send a dummy packet (or a keep-alive packet) for the purpose of maintaining the RRC connection with the 4G network. The dummy packet may be sent via the 4G signaling PDN.

According to an embodiment, because the case where the 5G-to-4G fallback is made corresponds to a situation where a 5G network situation is not appropriate for transmitting/receiving data or a problem occurs, it may be necessary to fall back to 4G as soon as possible. However, in the case where the 4G RRC connection is in a disconnected state, because a given time or longer is taken to again set up the 4G RRC connection, it may be difficult to fall back to 4G as soon as possible, thereby causing a problem in the use of an electronic device. To this end, the electronic device may maintain the RRC connection by using a dummy packet.

As described above, a 4G-5G switching operation may be performed under determination of the electronic device 100. In the electronic device 100, a switching notification message (or a switching notification IPC) may be sent by the 5G MMC 124 upon switching. For example, the switching notification message (or switching notification IPC) may be sent from the 5G MMC 124 to the RIL 112 via a path formed of the 4G MMC 122 and the RIL 112, and the RIL 112 that acquires the switching notification message may change an Internet PDN path of the electronic device 100. User data may be sent to the APP 111 via the changed Internet PDN path.

Here, to send the switching notification message, the 4G modem 121 and the 5G modem 123 may be coupled to each other via the hardware interface 140.

3. Configuration Block Diagram of Electronic Device According to Embodiment

Figure 4:
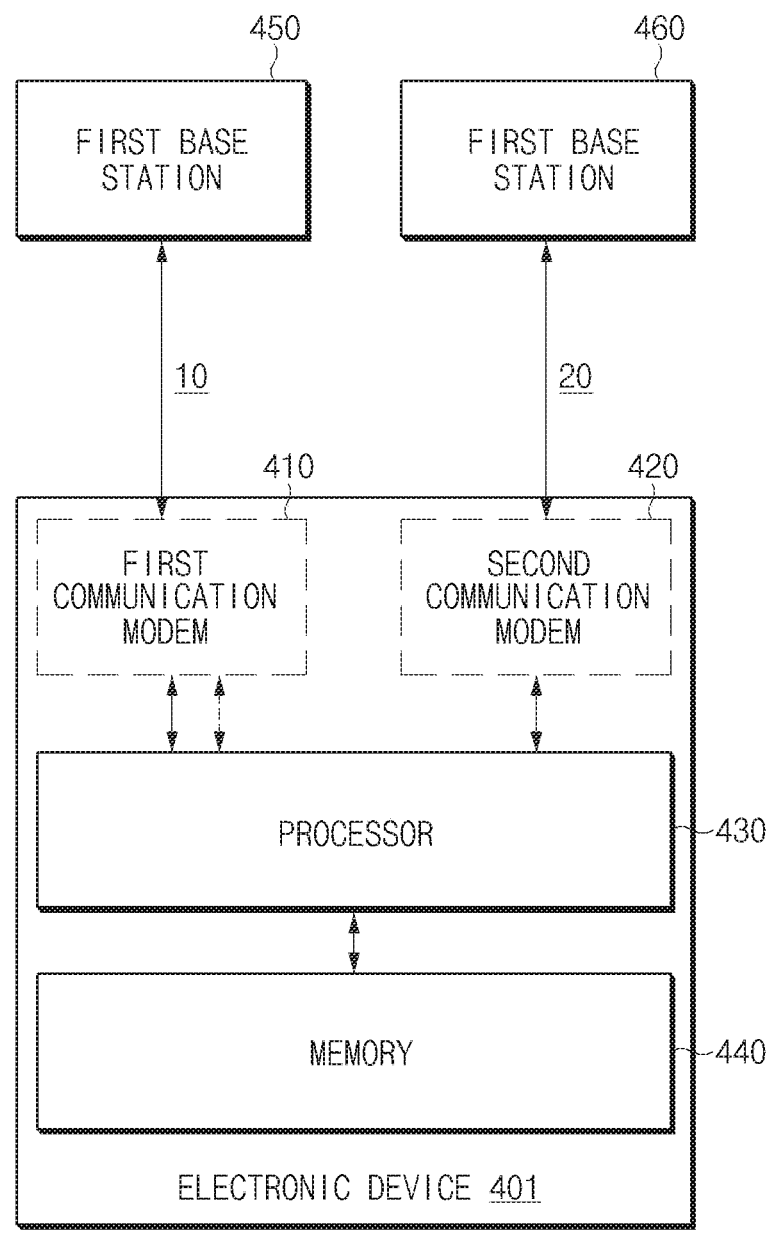
FIG. 4 illustrates a configuration block diagram of an electronic device according to an embodiment.

FIG. 4 illustrates a configuration block diagram of an electronic device according to an embodiment.

Referring to FIG. 4, an electronic device 401 may include a first communication modem 410, a second communication modem 420, the processor 430, and a memory 440. According to an embodiment, the electronic device 401 may be identical or similar to the electronic device 100 of FIGS. 1 to 3.

According to an embodiment, the electronic device 401 may support a first communication network 10 and a second communication network 20. The electronic device 401 may transmit or receive, via the first communication network 10, a signal with a first base station 450 supporting the first communication network 10 and may transmit or receive, via the second communication network 20, a signal with a second base station 460 supporting the second communication network 20.

According to an embodiment, the first communication network 10 may transmit/receive a signal of a frequency different from that of the second communication network 20. For example, the first communication network 10 may transmit/receive a signal in a frequency range lower than a frequency range of the second communication network 20. The first communication network 10 and the second communication network 20 may transmit/receive signals in frequency ranges that are partially identical.

According to an embodiment, the first communication network 10 may transmit/receive a signal in a first frequency range, and the second communication network 20 may transmit/receive a signal in a second frequency range. For example, the first frequency range may be a frequency selected between 500 MHz to 3000 MHz. The second frequency range may be a frequency selected from 20 GHz or higher.

According to an embodiment, the first communication network 10 may be a 4G communication network (e.g., a 4G network 10 of FIG. 1), and the second communication network 20 (e.g., a 4G network 20 of FIG. 1) may be a 5G communication network.

According to an embodiment, the first communication modem 410 may support the first communication network 10. For example, the first communication modem 410 may be a 4G communication modem. The first communication modem 410 may be identical or similar to the 4G communication modem 121 of FIGS. 2 and 3. The first communication modem 410 may transmit data acquired from the processor 430 via the first communication network 10 and may send data acquired via the first communication network 10 to the processor 430. According to an embodiment, the first communication modem 410 may include a processor (not illustrated).

According to an embodiment, the second communication modem 420 may support the second communication network 20. For example, the second communication modem 420 may be a 5G communication modem. The second communication modem 420 may be identical or similar to the 5G communication modem 123 of FIGS. 2 and 3. The second communication modem 420 may transmit data acquired from the processor 430 via the second communication network 20 and may send data acquired via the second communication network 20 to the processor 430. According to an embodiment, the second communication modem 420 may include a processor (not illustrated).

According to an embodiment, the first communication modem 410 and the second communication modem 420 may mutually support the interworking. To this end, the first communication modem 410 and the second communication modem 420 may be coupled to each other via the hardware interface 412. For example, the first communication modem 410 and the second communication modem 420 may perform the HS-UART communication.

According to an embodiment, a control path 411 to transmit/receive a control signal may be formed between the first communication modem 410 and the processor 430. The first communication modem 410 may exchange control information with the processor 430, for example, by using an IPC message.

According to an embodiment, a control path may not be formed between the second communication modem 420 and the processor 430, and the second communication modem 420 may transmit a control signal to the processor 430 via the first communication modem 410 or may acquire the control signal via the first communication modem 410. The first communication modem 410 may relay information exchange between the second communication modem 420 and the processor 430. The control information may include one of an RRC state, a switching message, IPC information, or RSSI information. The control information may be, for example, a switching notification message or an RRC status notification message.

According to an embodiment, the first communication modem 410 may turn on the second communication modem 420 or may send wireless connection information (e.g., RRC connected status information) to the second communication modem 420, and the second communication modem 420 may acquire the wireless connection information and may determine whether to change a data path of the electronic device 401 based at least on the wireless connection status information. When the second communication modem 420 changes the data path, the second communication modem 420 may send the switching notification message indicating switching of the data path to the processor 430 via the first communication modem 410 and may send the link switching message to the network. According to an embodiment, the second communication modem 420 may determine a change of the data path and may control a system to switch the data path. Besides, various operations according to the following scenarios of the first communication modem 410 and the second communication modem 420 may be performed.

According to an embodiment, the processor 430 may execute an operation associated with an RIL (e.g., the RIL 112 of FIG. 2) and an application (e.g., an application of FIG. 3), which are stored in the memory 440. The processor 430 may switch the data path and may send data associated with the application to the activated data path. The processor 430 may acquire control information (e.g., a switching notification message) generated by the second communication modem 420 via the first communication modem 410 and may switch the data path in response to the control information.

For example, when a first data path is connected, the processor 430 may send the data to the first communication modem 410 via the first data path; the first communication modem 410 may send the data via the first network 10 (or the first data path or a first Internet APN), or the processor 430 may receive data associated with the application via the first network 10.

For example, when a second data path is connected, the processor 430 may send the data to the second communication modem 420 via the second data path; the second communication modem 420 may transmit the data through the second network 20 (or the second data path or a second Internet APN), or the processor 430 may receive data associated with the application through the second network 20.

According to an embodiment, the first data path may be a path that starts from the processor 430 or an RIL and reaches a GW (e.g., the GW 600 FIG. 6) via the first communication modem 410, the first network 10, and the first base station 450. The second data path may be a path that starts from the processor 430 or the RIL and reaches the GW via the second communication modem 420, the second network 20, and the second base station 460.

According to an embodiment, the first data path and the second data path may share at least a partial path at the processor 430. The first data path and the second data path may share at least a partial path at the RIL.

According to an embodiment, the first communication modem 410 and the processor 430 may be included on the same AP system on chip (SoC), and the second communication modem 420 may be included in a separate SoC chip. Various interfaces such as an HS-UART, an UART, a universal serial bus (USB), and the like may be used as an inter-chip interface.

According to an embodiment, the first communication modem 410 and/or the second communication modem 420 may be included in the same CP system on chip (SoC). According to an embodiment, two communication modems on a single chip may be coupled by a physical signal line for communication between the communication modems.

According to an embodiment, the first communication modem 410 and/or the second communication modem 420 and/or the processor 430 may be included on the same AP system on chip (SoC). According to an embodiment, two communication modems on a single chip may be coupled by a physical signal line for communication between the communication modems.

According to an embodiment, the memory 440 may store the application and the RIL. The memory 440 may store instructions that cause the processor 430 to perform various embodiments of the disclosure.

4. Operation of Electronic Device and Change in Channel State According to Channel State FIG. 5 is a diagram illustrating an operation and a state change according to a channel state of an electronic device according to an embodiment.

Figure 5:
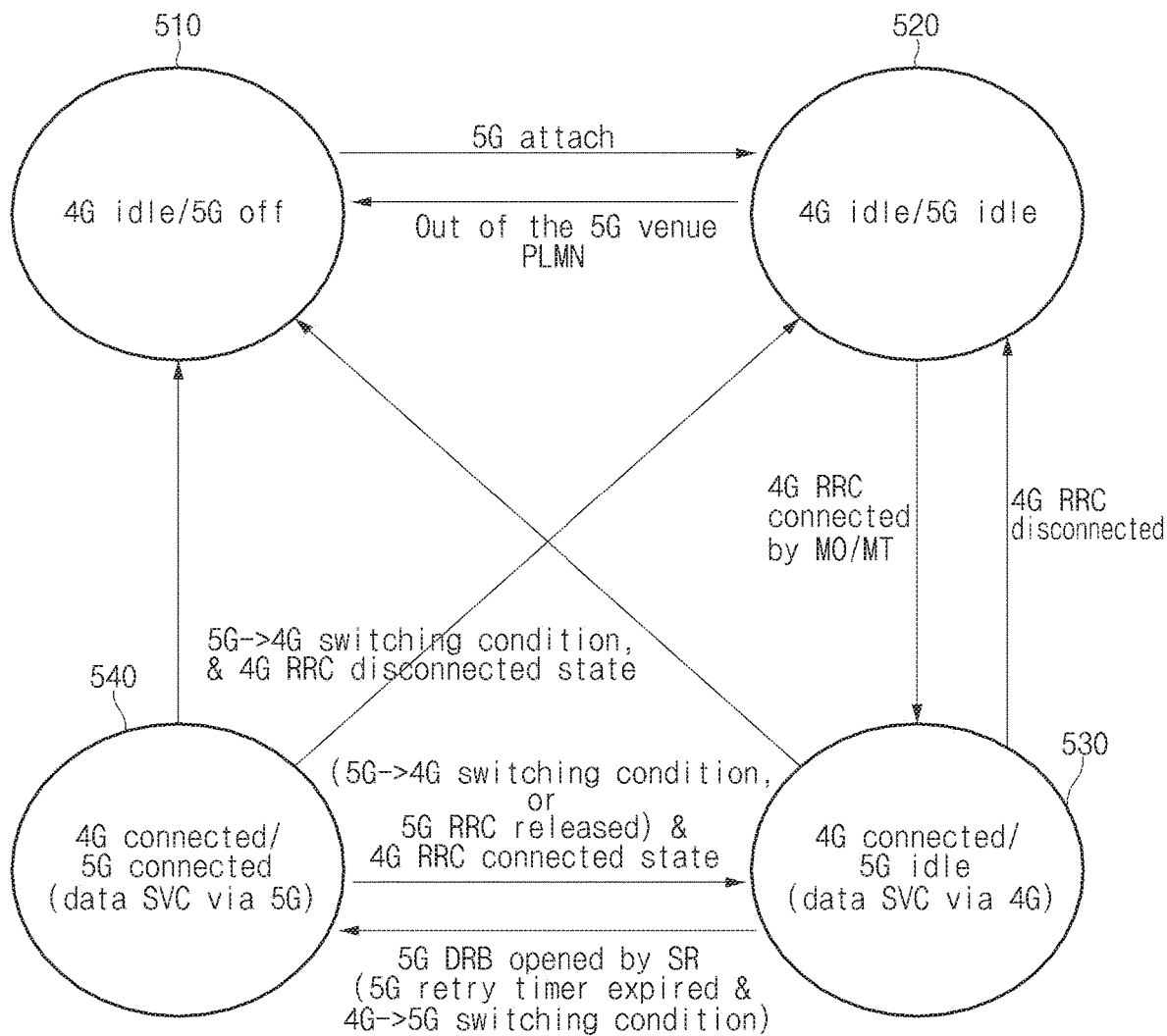
FIG. 5 is a diagram illustrating an operation and a state change according to a channel state of an electronic device according to an embodiment.

Referring to FIG. 5, an electronic device (e.g., the electronic device 100 of FIG. 1) may operate based on a modem state, a network state, and the like. In the following description, a scheme to transmit/receive data may be based on a switched virtual connection (SVC) scheme.

According to an embodiment, in state 510, a 4G modem (e.g., the 4G modem 121 of FIG. 1) may access the 4G network, 4G may be in an idle state, and 5G may be in a state where a modem is off, that is, in a state where a 5G modem (e.g., the 5G modem 123 of FIG. 1) is powered off. In state 510, when the electronic device enters a 5G venue, based on 4G PLMN and TAU information, the electronic device may turn on the 5G modem and may be attached to the 5G network.

According to an embodiment, when the electronic device successfully accesses the 5G network, the electronic device may transition to state 520 and may wait in state 520 until an MO or MT operation is performed. In state 520, both the 4G modem and the 5G modem may be in an RRC idle state.

In state 520, when the MO or MT operation occurs, the electronic device may be RRC connected with the 4G network, and user data may be transmitted/received via the 4G Internet PDN. In this case, the electronic device may transition to state 530.

In state 530, the 4G modem may be in an RRC connected state, and the 5G modem may be in an RRC idle state. In a state of being RRC connected with the 4G network, a 4G MMC (e.g., the 4G MMC 122 of FIG. 2) may update the 4G RRC connected state to a 5G MMC (e.g., the 5G MMC 124 of FIG. 2) by using a 4G RRC status notification message. When the 5G MMC recognizes the RRC connection with the 4G network based on the notification message, the 5G MMC may reset a 5G retry timer. The 5G MMC may prevent unnecessary ping-pong by blocking switching until the timer expires.

Because the electronic device is already in the 4G RRC connected state in state 530, the electronic device may check whether to satisfy a switching condition to 5G based on a situation of the 5G network. When the switching condition to 5G is satisfied and it is output of a ping-pong condition as the 5G retry timer expires, the 5G modem may send the service request SR to the 5G network and may generate the DRB (or may open the DRB). When the DRB is completely generated, the electronic device may change a data path to 5G and may transmit/receive user data via the 5G Internet PDN. In this case, the electronic device may transition to state 540.

In state 540, the 4G modem may be in a state of being RRC connected with the 4G network, and the 5G modem may be in a state of being RRC connected with the 5G network. A situation where data are switched to 4G in state 540 will be described below.

When the electronic device is out of the 5G PLMN venue in state 520 to state 540, the electronic device may power off the 5G modem and may transition to an initial state (state 510).

Below, how the switching to 4G is made in state 540 will be more fully described with reference to FIG. 6.

Figure 6:
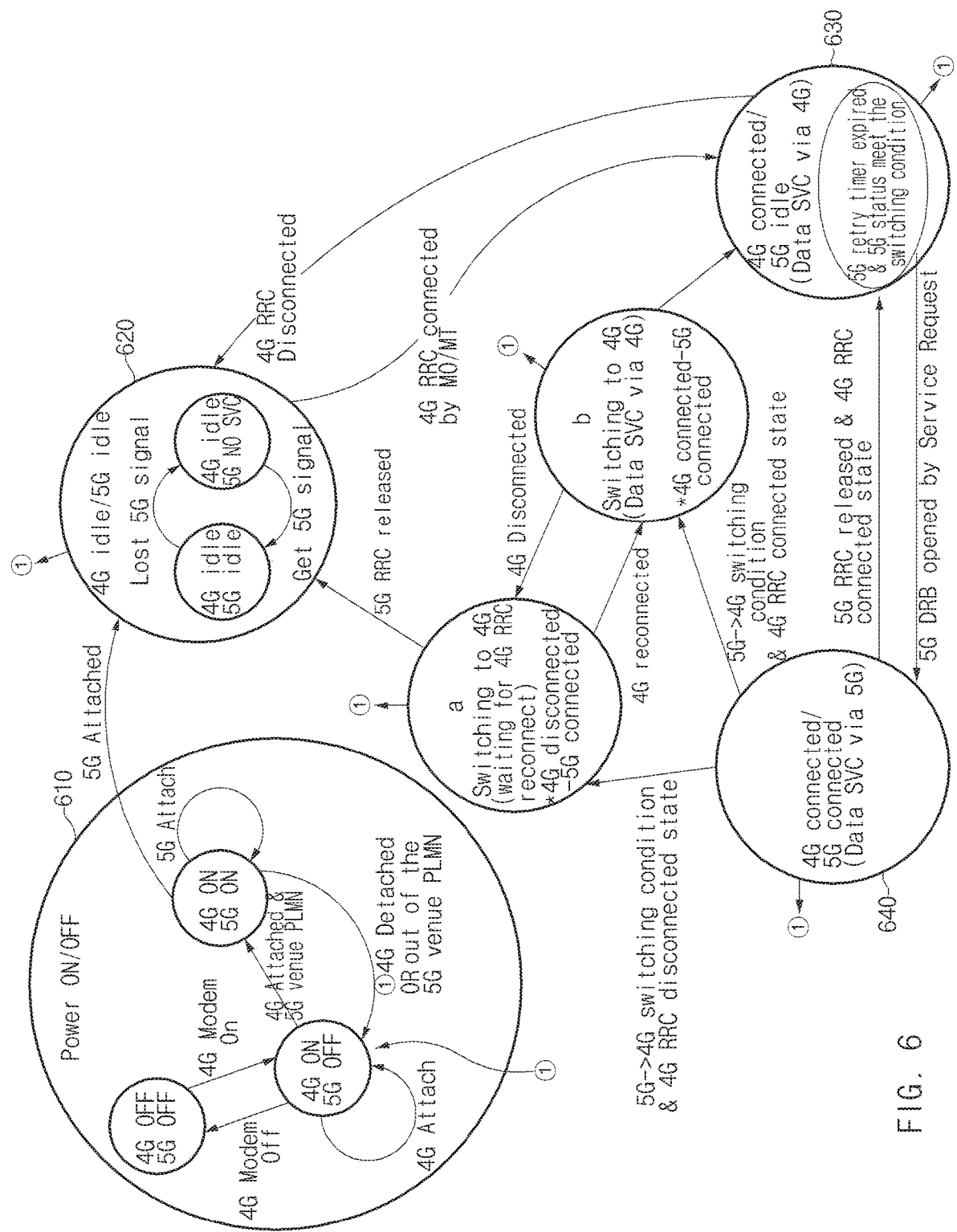
FIG. 6 is a diagram illustrating an operation and a state change according to a channel state of an electronic device according to an embodiment.

FIG. 6 is a diagram illustrating an operation and a state change according to a channel state of an electronic device according to an embodiment.

FIG. 6 shows and describes states of an electronic device mainly associated with operations of the electronic device in a 5G venue. A state of an electronic device that accesses only 4G in a venue except for the 5G venue is substituted for a description associated with state 620, and thus, additional description will be omitted to avoid redundancy. In the following description, a scheme to transmit/receive data may be based on the SVC scheme.

Referring to FIG. 6, an electronic device (e.g., the electronic device 100 of FIG. 1) in state 640 may satisfy a condition to transition to state 620 or state 630. This may be a situation where the electronic device falls back to 4G. Here, state 620 to state 640 may be identical or similar to state 520 to state 530 of FIG. 5 of state 610 may be identical or similar to state 520. A condition to transition to state 620 or state 630 will be described below.

According to an embodiment, the electronic device may transition to state 630 when user data are completely transmitted/received via the 5G Internet PDN in state 640. When the user data are completely transmitted/received, the RRC deactivation timer may expire, and thus, a 5G RRC connection may be released. In this case, because a 4G RRC state maintains a connected state by a dummy packet (or a keep-alive packet), the 4G fallback may be made, and a transition to state 630 may be possible.

According to an embodiment, the electronic device may check whether to satisfy a switching condition to 4G in state 640. When satisfying the switching condition to 4G and being in the 4G RRC connected state, the electronic device may transition to state 640 via "b" of state 640. In this case, the electronic device may fall back to 4G, may change a data path to the 4G Internet PDN, and may transmit/receive user data via the 4G Internet PDN, and the electronic device may maintain a 5G RRC connected state because a 5G RRC deactivation timer does not yet expire ("b" of state 640 in FIG. 6).

In "b" of state 640, even though the electronic device is in the 5G RRC connected state, data may not be transmitted/received. In this case, "b" of state 640 may be maintained until the 5G RRC deactivation timer expires; afterwards, when the 5G RRC deactivation timer expires, the 5G RRC connection may be released, and a transition to state 630 may be possible.

In the case where there occurs a situation where the 4G RRC connection is disconnected in "b" of state 640, the electronic device may transition to "a" of state 640 and may wait until a 4G RRC reconnect is performed, and the electronic device may return to "b" of state 640 when the 4G RRC reconnect is established. Afterwards, the electronic device may wait until the 5G RRC connection is released and may then fall back to 4G. When the 5G RRC connection is released by the 5G RRC deactivation timer before the 4G RRC reconnect is performed in "a" of state 640, a transition to state 620 may be made, and a 5G fallback operation may be completed. In this case, the electronic device may wait in state 620 until the MO or MT operation occurs. However, because the 4G RRC connection is maintained by a dummy packet via a signaling PDN while user data are transmitted/received by using 5G, upon the 5G-to-4G fallback, a situation where the 4G RRC connection is disconnected may exceptionally occur.

According to an embodiment, in the case where the switching condition to 4G is satisfied in state 640 and the 4G RRC connection is disconnected, the electronic device may transition to state 630 via "a" of state 640. In this case, because the 4G RRC connection is disconnected, the electronic device may first switch a data path to 4G and may transition to "a" of state 640 in which the electronic device waits until the 4G RRC reconnect is performed. Afterwards, when the 4G RRC reconnect is established, a transition to "b" of state 640 may be made, and user data may be transmitted/received via the 4G Internet PDN. Afterwards, when the 5G RRC connection is released by the 5G RRC deactivation timer, a transition to state 630 may be made, and the 4G fallback operation may be completed.

Figure 7:
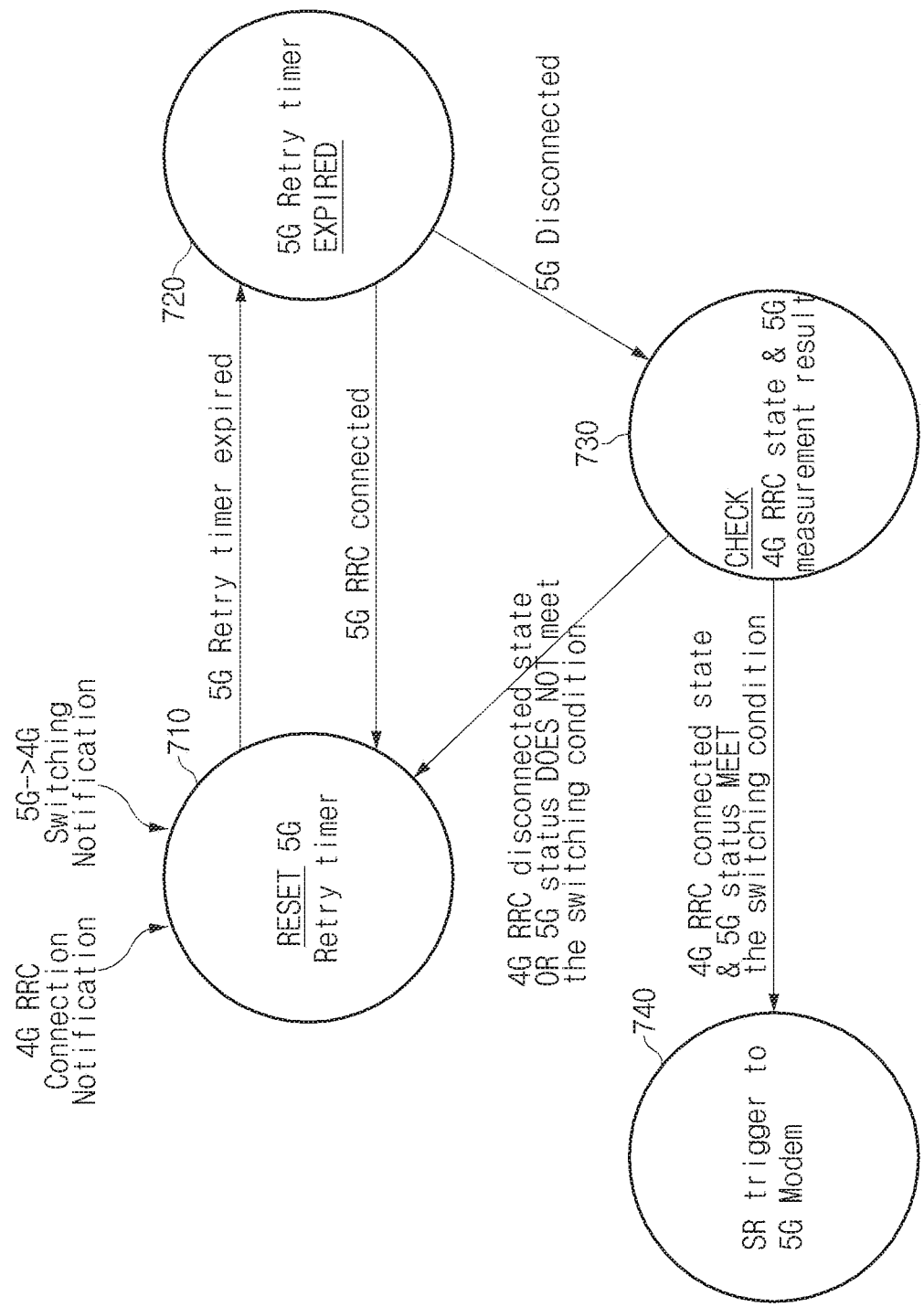
FIG. 7 is a state diagram of an electronic device operating a 5G retry timer according to an embodiment.

FIG. 7 is a state diagram of an electronic device operating a 5G retry timer according to an embodiment.

Referring to FIG. 7, an electronic device (e.g., the electronic device 100 of FIG. 1) may operate the 5G retry timer for the purpose of preventing an unnecessary ping-pong phenomenon upon 4G-5G switching.

According to an embodiment, in state 710, a 5G MMC (e.g., the 5G MMC 124 of FIG. 4) may operate the 5G retry timer. The 5G retry timer may be initiated or reset when the 5G MMC recognizes that a 4G RRC connection is made based on a 4G RRC status notification message and sends a 5G-to-4G fallback switching notification message. Why to reset the timer when the 4G RRC connection is recognized may be for the electronic device to check a 5G radio state and to verify that a 5G state is stably maintained, during a given time, in the case where the 4G RRC connected state of conditions to switch to 5G is satisfied. To switch to 5G in the case where the 5G state varies around a boundary of a switchable condition may be difficult to secure performance.

Why to reset when a 5G-to-4G fallback switching notification is sent may be for reducing a loss of user data due to frequent switching and improving the performance of the electronic device. In the case where a 5G network state becomes good after the electronic device falls back to 4G, there may occur the case of switching to 5G as soon as the fallback. In the case where user data are lost during 4G-5G switching, the performance and use of the electronic device may be reduced. To prevent this issue, even though a 5G situation becomes good after the 4G fallback, the electronic device may switch to 5G after a given time. For example, the electronic device may switch to 5G after the 5G retry timer expires.

According to an embodiment, when the 5G retry timer expires, in state 720, the 5G MMC may identify a 5G RRC state. In the case where the electronic device is in the 5G RRC connected state, because data are being already transmitted/received by using 5G, the electronic device may transition to state 710. For example, the electronic device may reset the 5G retry timer. Even though the 5G retry timer is reset in a situation of falling back to 4G, the electronic device may not again switch to 5G in a situation where the 5G RRC connection is not yet released.

According to an embodiment, because a state where a connection to the 5G network is not made corresponds to a situation of preparing 4G-to-5G switching, the 5G MMC may identify a 4G RRC state and a 5G measurement result. In the case where the 4G RRC state is a disconnected state or the 5G measurement result does not satisfy a switching condition, because switching to 5G is impossible, a transition to state 710 may be made. For example, the electronic device may reset the 5G retry timer and may wait until the 5G retry timer expires. In the case where the 4G RRC state is a connected state and the 5G measurement result satisfies the switching condition, the 5G MMC may trigger the SR via a 5G modem (e.g., the 5G modem 123 of FIG. 3), may generate the DRB (or may open the DRB), and may perform a 4G-to-5G switching operation.

5. Signal Transmission/Reception Between Electronic Device and Network

Figure 8:
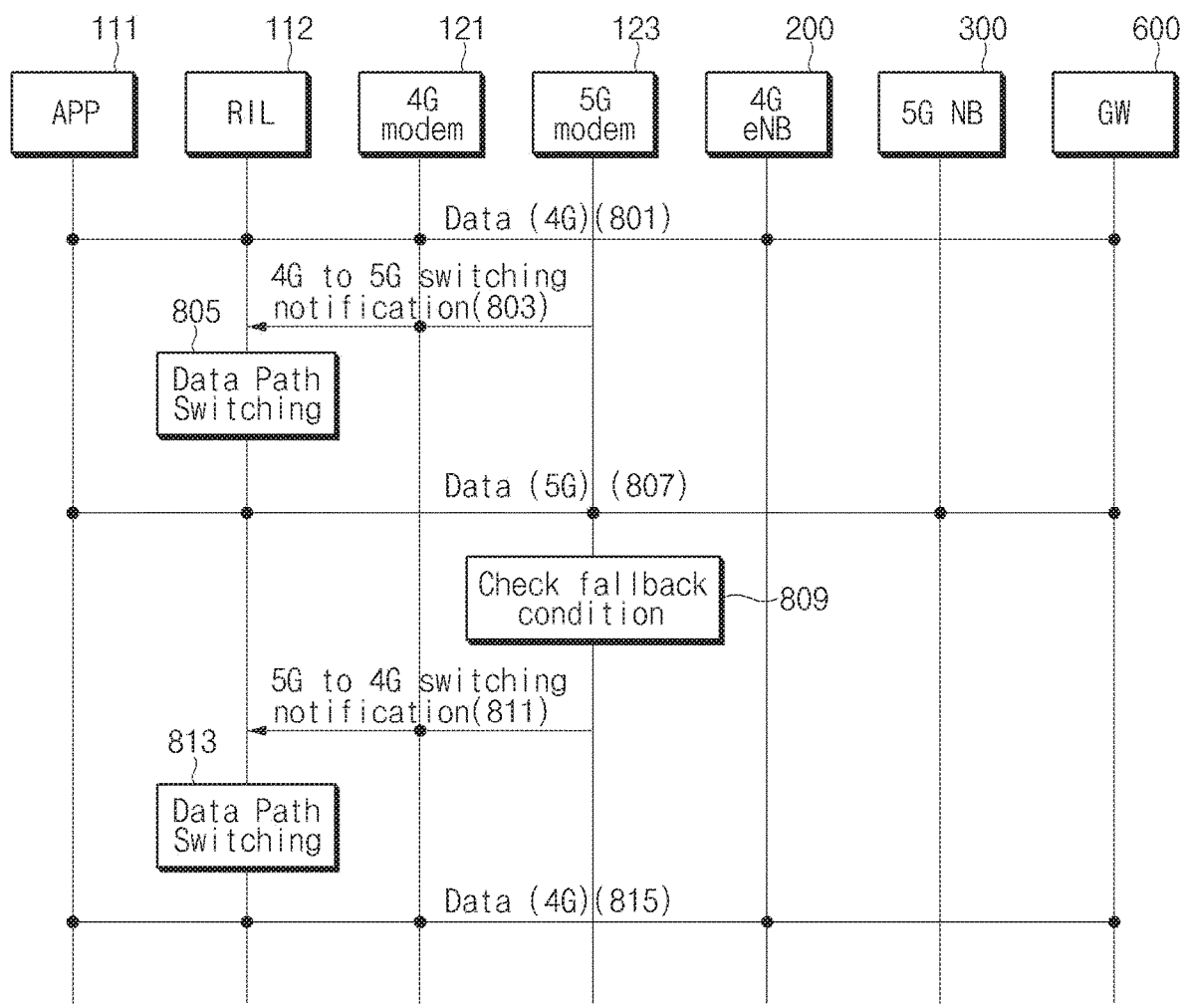
FIG. 8 is a flowchart of an operation in which an electronic device according to an embodiment switches a data path and transmits/receives data.

FIG. 8 is a flowchart of an operation in which an electronic device according to an embodiment switches a data path and transmits/receives data.

According to an embodiment, after an electronic device (e.g., the electronic device 100 of FIG. 1) may access the 4G network, the electronic device may switch to the 5G network while being RRC connected to the 4G network and transmitting/receiving data and may transmit/receive the data, or the electronic device may fall back to the 4G network in the middle of transmitting/receiving the data via the 5G network and may transmit/receive the data via the 4G network. In the following description, the APP 111, the RIL 112, the 4G modem 121, the 5G modem 123, the 4G eNB 200, the 5G NB 300, and the GW 600 may be identical or similar to the components of FIGS. 1 to 4. Below, a detailed operation of the electronic device will be described with reference to FIG. 8 assuming a situation in which data are transmitted/received via 4G. In operation, a 4G modem may include a 4G MMC, and a 5G modem may include a 5G MMC. For example, the 4G modem may include a CP, and the CP may operate or execute a 5G MMC module implemented by software. For example, the 5G modem may include a CP, and the CP may operate or execute a 5G MMC module implemented by software. In operation 801, the electronic device may transmit or receive data associated with the application 111 via the 4G modem 121. The electronic device may transmit/receive the data via the 4G data path. The 4G data path may include a path coupled to the GW 600 via the RIL 112 and the 4G modem 121.

The electronic device may determine whether to satisfy a switching condition to a 5G data path; when the switching condition is satisfied, in operation 803, the 5G modem 123 may send a switching notification message to the RIL 112. However, because a control path capable of transmitting/receiving the switching notification message is not formed between the 5G modem 123 and the RIL 112, the 5G modem 123 may send the switching notification message to the RIL 112 through the 4G modem 121.

According to an embodiment, the 4G modem 121 may relay the transmission of the switching notification message. The 4G modem 121 may acquire the switching notification message from the 5G modem 123 and may send the switching notification message to the RIL 112. The switching notification message may be sent from the 5G modem 123 to the 4G modem 121, for example, by using the HS-UART communication.

In operation 805, the RIL 112 may switch a data path from 4G to 5G as a response to the switching notification message. The electronic device may send the link switching message for the purpose of switching a data path on a network, and the GW 600 may acquire the link switching message and may change the data path from 4G to 5G.

In operation 807, the RIL 112 may send data acquired from the APP 111 via the changed data path. The electronic device may send the data to the network via the RIL 112 and the 5G modem 123.

In operation 809, the 5G modem 123 may determine a switching condition for the purpose of determining whether the fallback to 4G is necessary. The case where the fallback to 4G is necessary may include, for example, the case where data are completely transmitted/received, the case where it is difficult to transmit/receive a signal any longer as a link state becomes bad (e.g., occurrence of an RLF), and the like.

In operation 811, the 5G modem 123 may send the 5G-to-4G switching notification message to the RIL 112 for the purpose of switching the data path to 4G.

In operation 813, the RIL 112 may switch the data path from 5G to 4G. In this case, the electronic device may maintain the 4G RRC connected state for the purpose of quickly falling back to 4G and stably transmitting/receiving data. To this end, a dummy packet may be used. The 5G modem 123 may send the link switching message to the GW 600 for the purpose of switching the data path on the network. The link switching message may direct to switch the data path from 5G to 4G.

In operation 815, the electronic device may transmit/receive data associated with the application 111 with the network via the 4G data path. The data associated with the application 111 may reach the GW 600 via the RIL 112, the 4G modem 121, and the 4G eNB 200 or may reach the electronic device via an opposite path.

FIG. 8 schematically illustrates a data transmission/reception operation of the electronic device, but various operation scenarios of the electronic device in a 4G and 5G interworking system, such as an access operation of an electronic device, data switching of an electronic device, and the like, will be described below with reference to FIGS. 9 to 12.

5.1 Network Access Operation of Electronic Device

Figure 9:
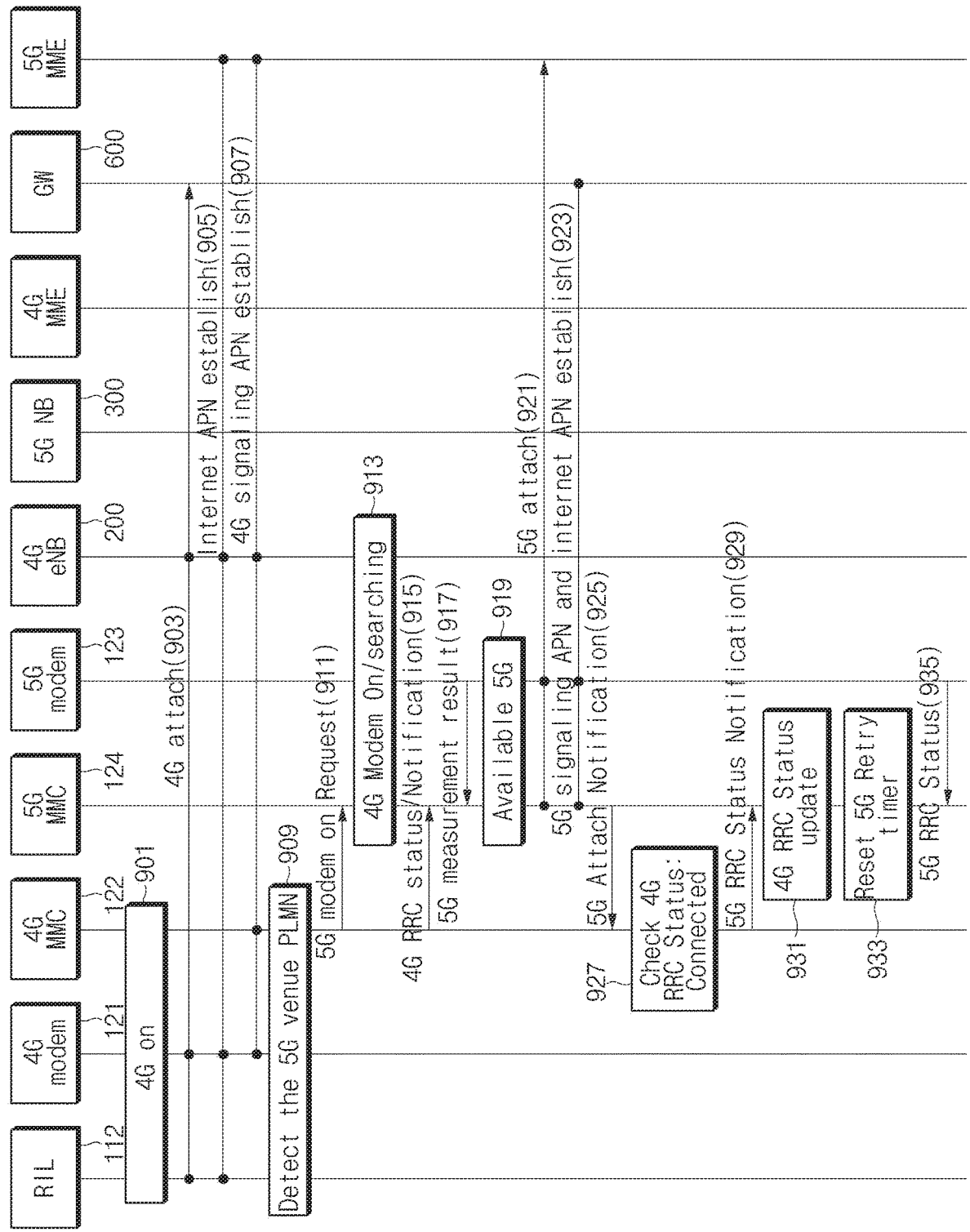
FIG. 9 is a flowchart of an operation in which an electronic device according to an embodiment accesses a network.

FIG. 9 is a flowchart of an operation in which an electronic device according to an embodiment accesses a network.

According to an embodiment, an electronic device (e.g., the electronic device 100 of FIG. 1) may access the 4G network and may access the 5G network in a state of being RRC connected to the 4G network. In the following description, the RIL 112, the 4G MMC 122, the 5G MMC 124, the 5G modem 123, the 4G eNB 200, the 5G NB 300, the GW 600, the 4G MME, and the 5G MME may be identical or similar to the components of FIGS. 1 to 4. Below, a detailed operation of the electronic device will be described with reference to FIG. 9.

In operation 901, the electronic device may turn on the 4G modem 121. The turn-on operation of the 4G modem 121 may be identical or similar to a turn-on operation of a conventional 4G electronic device.

In operation 903, after the 4G modem 121 is turned on, the electronic device may make registration at the 4G network and may perform an access thereto. For example, the electronic device may access the 4G network via the RIL 112 and the 4G modem 121.

In operation 905, the electronic device may establish the 4G Internet APN to maintain a state where MO or MT is possible. The GW 600 may send a dummy packet to the electronic device via the 4G Internet APN established in operation 905 upon transmission/reception of user data and may maintain the 4G RRC connected state.

In operation 907, the electronic device may establish the 4G signaling APN to be used upon 4G-5G interworking. For example, the 4G modem 121 may establish the 4G signaling APN. The electronic device may send a 5G-to-4G switching notification message to the GW 600 via the APN.

In operation 909, the electronic device may determine whether the electronic device is in a 5G venue. For example, the 4G MMC 122 may determine whether the electronic device is in the 5G venue, based on the 4G PLMN and/or TAU. When it is determined that the electronic device is in the 5G venue, the 4G MMC 122 may perform operation 911.

In operation 911, the electronic device may turn on the 5G modem 123. For example, the 4G MMC 122 may request the 5G MMC 124 to turn on the 5G modem.

In operation 913, the 5G modem 123 may be turned on, and wireless signal search may be performed.

In operation 915, the 4G modem 121 may update a 4G RRC state to the 5G modem 123. For example, after the 5G modem 123 is turned on, the 4G MMC 122 may first update the 4G RRC state to the 5G modem 123 by using the 4G RRC status notification message. Afterwards, the 4G MMC 122 may update the RRC state to the 5G MMC 124 whenever the 4G RRC state is changed.

In operation 917, the 5G modem 123 may update a 5G measurement result. Afterwards, the 5G modem 123 may periodically update the 5G measurement result to the 5G MMC 124.

In operation 919, the 5G MMC 124 may verify that the 5G network is in an available state. In operation 921, the 5G MMC 124 may perform a registration and attach procedure via the 5G modem 123.

In operation 923, the 5G MMC 124 may perform an APN connection via the 5G modem 123. The 5G MMC 124 may establish the 5G signaling APN and the 5G Internet APN.

In operation 925, the 5G MMC 124 may notify the 4G MMC 122 that the 5G attach is completed. When the 5G attach and the APN connection are completed, the 5G MMC 124 may notify the 4G MMC 122 that the 5G attach is completed, by using an attach status notification message.

In operation 927, the 4G MMC 122 may check whether the 4G RRC connection is made. When the 4G MMC 122 recognizes that the 5G network attach of the 5G modem 123 is completed based on the attach status notification message, the 4G MMC 122 may identify a current 4G RRC state.

In operation 929, the 4G MMC 122 may update the 4G RRC state to the 5G MMC 124. The 4G MMC 122 may notify the 4G RRC state of the 5G MMC 124 by using the 4G RRC status notification message.

*250In operation 931, the 5G MMC 124 may update the 4G RRC state acquired from the 4G MMC 122.

In operation 933, the 5G MMC 124 may reset the 5G retry timer. When the timer expires, the 5G MMC 124 may check availability of the 5G network and may determine whether it is possible to switch to 5G.

In operation 935, when the turn-on and attach operations are completed, the 5G modem 123 may update the 5G RRC state to the 5G MMC 124. When the 5G RRC state is changed, the 5G modem 123 may update the change in the 5G RRC state to the 5G MMC 124. The 5G MMC 124 may operate the 5G retry timer with reference to the 5G RRC state.

5.2 MO or MT Data Call Setup Operation in 4G Network

Figure 10:
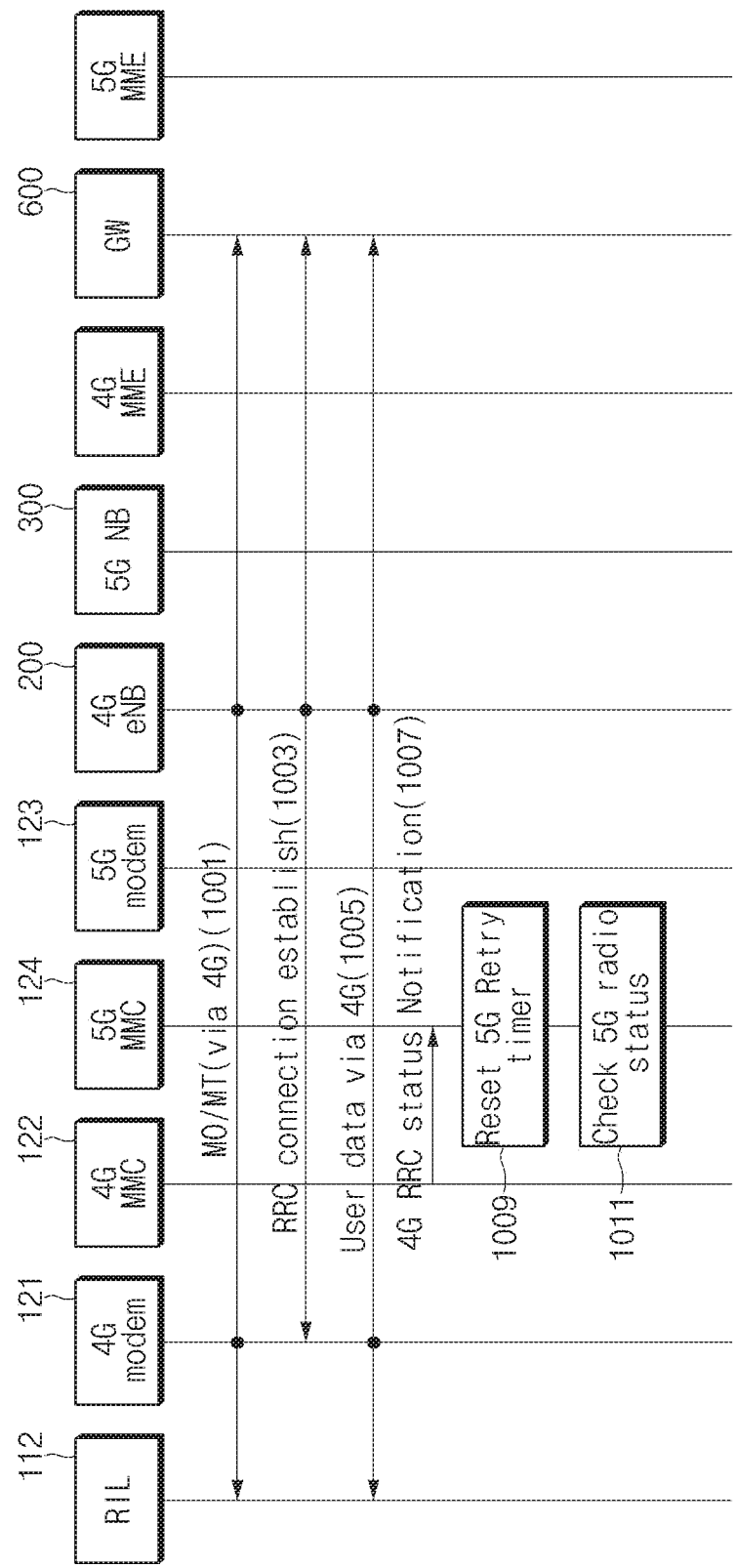
FIG. 10 is a message flowchart when an electronic device according to an embodiment performs an MO or MT operation.

FIG. 10 is a message flowchart when an electronic device according to an embodiment performs an MO or MT operation.

According to an embodiment, an MO or MT operation of an electronic device (e.g., the electronic device 100 of FIG. 1) may occur on the 4G network. The 4G modem 121 of the electronic device may process the MO or MT operation. In the following description, the RIL 112, the 4G MMC 122, the 5G MMC 124, the 5G modem 123, the 4G eNB 200, the 5G NB 300, the GW 600, the 4G MME, and the 5G MME may be identical or similar to the components of FIGS. 1 to 4. Below, a detailed operation of the electronic device will be described with reference to FIG. 10.

In operation 1001, the MO or MT operation may be performed via the 4G network. The MO or MT operation may be performed between the RIL 112 and the GW 600 via the 4G modem 121.

In operation 1003, the 4G modem 121 may establish an RRC connection for an MO or MT data call connection.

When the RRC connection is completed by the 4G modem 121, the electronic device may perform operation 1005.

In operation 1005, the electronic device may transmit/receive user data. The electronic device may transmit/receive the user data via the 4G Internet APN. When transmitting/receiving data, the electronic device may transmit/receive the data via the RIL 112 and the 4G modem 121.

In operation 1007, the 4G MMC 122 may update a 4G RRC state to the 5G MMC 124. The 4G MMC 122 may update that the 4G RRC state is changed to a connected state, to the 5G MMC 124. The 4G MMC 122 may notify the 4G RRC state of the 5G MMC 124 by using the 4G RRC status notification message. When acquiring that the RRC state is the connected state, the 5G MMC 124 may perform operation 1009.

In operation 1009, the 5G MMC 124 may reset the 5G retry timer. The 5G MMC 124 may reset the 5G retry timer and may update the 4G-to-5G switching condition.

In operation 1011, the 5G MMC 124 may refer to the updated 5G measurement result and may check whether to satisfy the switching condition. In operation 1011, the 5G MMC 124 may check radio status (or channel status) based on the 5G measurement result. When the switching condition in operation 1009 and operation 1011 is satisfied, the 5G MMC 124 may perform 4G-to-5G switching. For example, when the 4G modem 121 is the 4G RRC connected state, the 5G retry timer expires, and the 5G network is in an available state, the 5G MMC 124 may perform 4G-to-5G switching.

5.3 4G to 5G Switching Operation

Figure 11:
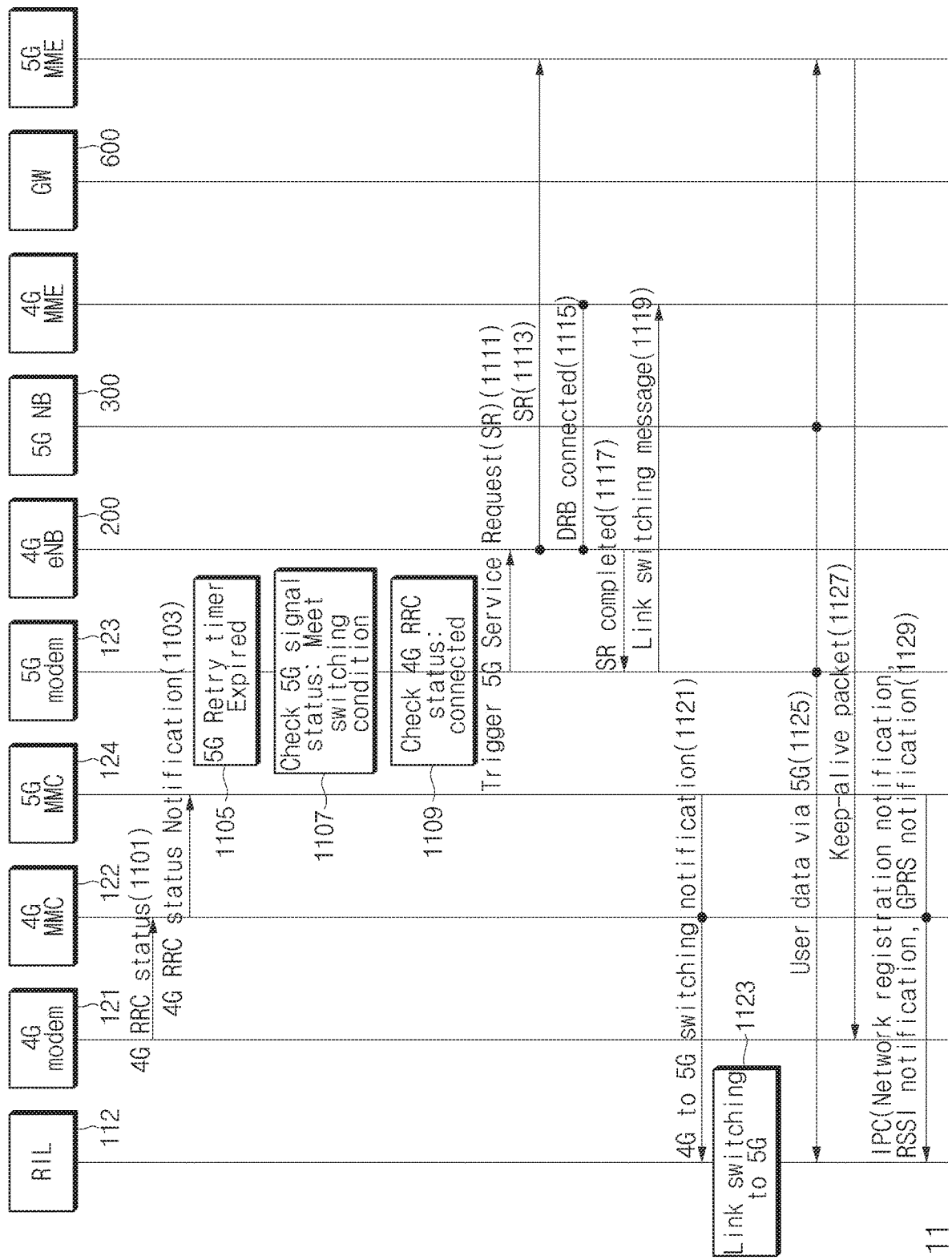
FIG. 11 is a message flowchart when an electronic device according to an embodiment performs a 4G-to-5G switching operation.
Figure 12:
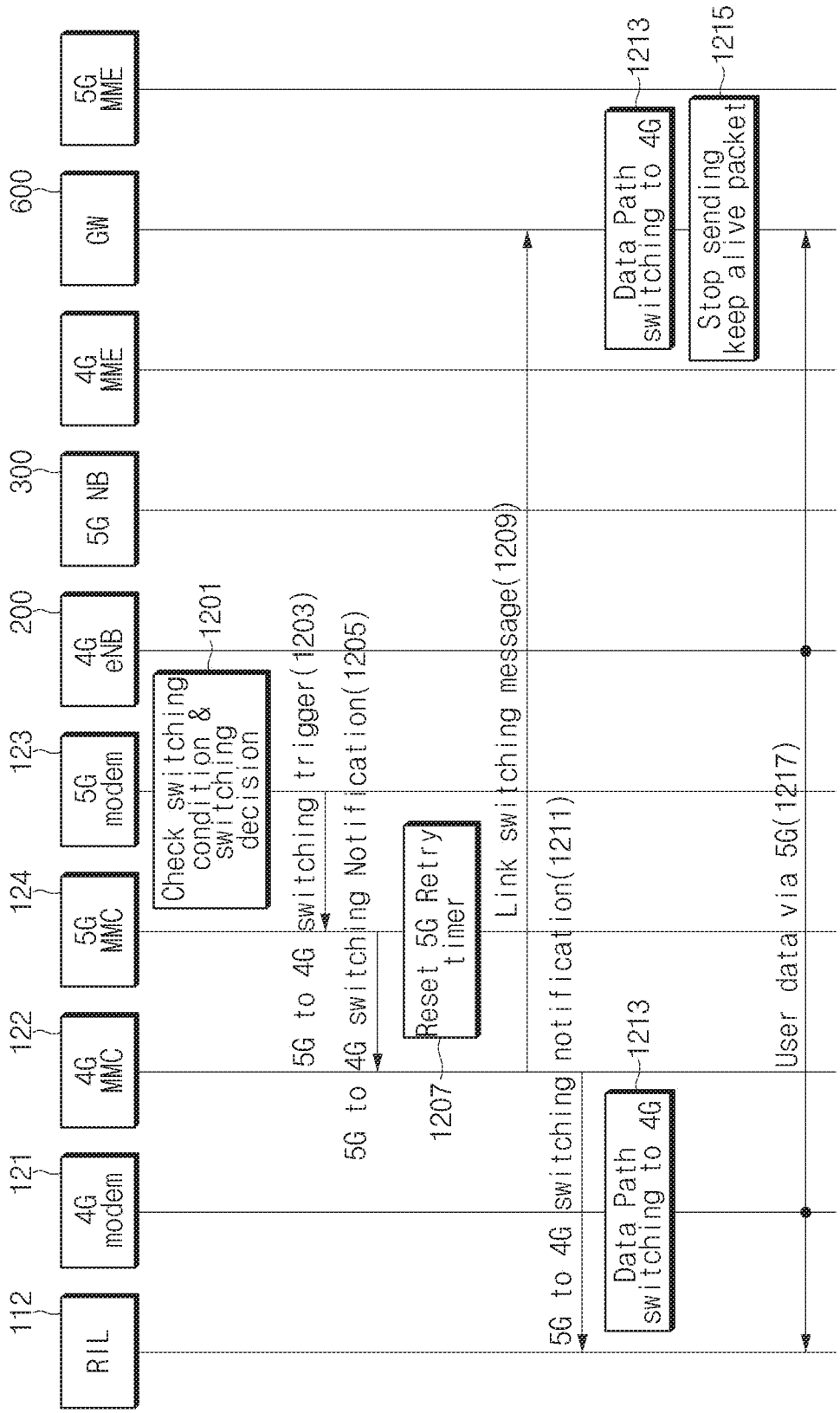
FIG. 12 is a message flowchart while an electronic device according to an embodiment performs 5G-to-4G fallback.

FIG. 11 is a message flowchart when an electronic device according to an embodiment performs a 4G-to-5G switching operation.

According to an embodiment, when a switching condition to 5G is satisfied, an electronic device (e.g., the electronic device 100 of FIG. 1) may switch a data path for transmitting/receiving data from 4G to 5G and may request or direct the GW 600 to change a data path on a network. The RIL 112, the 4G MMC 122, the 5G MMC 124, the 5G modem 123, the 4G eNB 200, the 5G NB 300, the GW 600, the 4G MME, and the 5G MME may be identical or similar to the components of FIGS. 1 to 4. Below, a detailed operation of the electronic device will be described with reference to FIG. 11.

Referring to FIG. 11, in operation 1101, the 4G modem 121 may update 4G RRC status to the 4G MMC 122. Whenever an RRC state is changed, the 4G modem 121 may update RRC status information to the 4G MMC 122.

In operation 1103, the 4G MMC 122 may update the RRC state to the 5G MMC 124. The 4G MMC 122 may refer to the RRC status information updated by the 4G modem 121 and may update the corresponding information to the 5G MMC 124.

In operation 1105 to operation 1109, the 5G MMC 124 may check a 4G-to-5G switching condition and may prepare a switching operation. In operation 1105, the 5G MMC 124 may determine whether a retry timer expires. When the 5G retry timer expires or from a time when the 5G retry timer expires, the 5G MMC 124 may check the 4G-to-5G switching condition. When a 5G measurement result does not satisfy the switching condition, the 5G retry timer may be reset. When the reset 5G retry timer expires, the switching condition may be checked with reference to a 5G measurement result updated after the expiration. In operation 1107, the 5G MMC 124 may refer to the updated 5G measurement result and may check the switching condition.

In operation 1109, the 5G MMC 124 may check the updated 4G RRC state. The 5G MMC 124 may check whether the 4G RRC state is a connected state. When the 4G RRC state is the connected state, operation 1111 may be performed. Because 5G switching is impossible when the 4G RRC state is a disconnected state, the 5G retry timer may be reset, and it may wait until the 4G RRC state is changed. When the 4G-to-5G switching condition is satisfied, in operation 111, the 5G MMC 124 may trigger the SR to the 5G network via the 5G modem 123 and may start a data connection.

When the transmission of the SR is requested from the 5G MMC 124, in operation 1113, the 5G modem 123 may send the SR to the 5G network.

In operation 1115, a 5G DRB may be opened by the service request triggered by the 5G MMC 124, and it may be possible to transmit/receive data via the 5G network communication.

In operation 1117, the 5G modem 123 may notify the 5G MMC 124 that it is possible to transmit/receive data via the 5G network communication. The 5G modem 123 may notify the 5G MMC 124 that it is possible to transmit/receive data via the 5G network communication, by using a service request complete message.

In operation 1119, the 5G MMC 124 may send the link switching message to the GW 600. The 5G MMC 124 may send the link switching message via the 5G signaling APN.

In operation 1121, the 5G MMC 124 may send a switching notification message to the RIL 112 via the 4G MMC 122. The 5G MMC 124 may send the switching notification message to the RIL 112 via the IPC.

In operation 1123, the GW 600 and the RIL 112 may change a data path (or an Internet APN) to 5G. The GW 600 may acquire the link switching message, the RIL 112 may acquire the switching notification message, and each of the GW 600 and the RIL 112 may change a data path.

In operation 1125, user data may be transmitted/received via the changed data path. In operation 1123, because changing the data path to 5G, the electronic device may acquire the user data via the 5G network communication (or the 5G data path or the 5G Internet APN).

In operation 1127, the GW 600 may send a dummy packet to the 4G modem 121 via the 4G signaling APN and may allow the 4G RRC connection to be maintained.

When the data path via 5G is completely switched, in operation 1129, data connection-related IPCs may be generated at the 5G MMC 124 and may be sent to the RIL 112 via the 4G MMC 122. In this case, to avoid transmission redundancy of the same IPC at the 4G modem 121 and the 5G modem 123, the 4G modem 121 may stop sending the corresponding IPCs. The IPCs may be, for example, network registration notification, RSSI information notification, and data connection notification IPCs.

5.4 4G to 5G Switching Operation (4G Fallback)

*282FIG. 12 is a message flowchart while an electronic device (e.g., the electronic device 100 of FIG. 1) according to an embodiment performs 5G-to-4G fallback.

According to an embodiment, when a switching condition to 4G is satisfied, an electronic device (e.g., the electronic device 100 of FIG. 1) may switch a data path for transmitting/receiving data from 5G to 4G and may request or direct the GW 600 to change a data path on a network. The RIL 112, the 4G MMC 122, the 5G MMC 124, the 5G modem 123, the 4G eNB 200, the 5G NB 300, the GW 600, the 4G MME, and the 5G MME may be identical or similar to the components of FIGS. 1 to 4. Below, a detailed operation of the electronic device will be described with reference to FIG. 12.

In operation 1201, the 5G modem 123 may check a 4G fallback condition with reference to a 5G network situation during 5G data transmission/reception. When the 5G modem 123 determines that the 4G fallback is required, in operation 1203, the 5G modem 123 may trigger the 4G fallback to the 5G MMC 124. For example, when it is determined that it is impossible to transmit/receive data via 5G, the 5G modem 123 may trigger the 4G fallback.

When a 4G fallback request is received from the 5G modem 123, in operation 1205, the 5G MMC 124 may send a switching notification message to the 4G MMC 122. In this case, the switching notification message may be a message indicating 5G-to-4G switching.

In operation 1207, the 5G MMC 124 may reset the 5G retry timer. The occurrence of unnecessary ping-pong may decrease by using the 5G retry timer.

In operation 1209, the 4G MMC 122 that acquires the 4G fallback request from the 5G MMC 124 may send the link switching message to the GW 600. The 4G MMC 122 may send the link switching message to the GW 600 via the 4G signaling APN.

In operation 1211, the 4G MMC 122 may send the switching notification message to the RIL 112. The 4G MMC 122 may send the switching notification message to the RIL 112 via the IPC.

In operation 1213, the GW 600 and the RIL 112 may change data paths in response to the link switching message and the switching notification message. The GW 600 may receive the link switching message and may change the data path (or the Internet APN) from 5G to 4G. The RIL 112 may receive the switching notification message and may change the data path from 5G to 4G. Switching of a data path may be switching of a link.

In operation 1215, the GW 600 may stop sending a dummy packet. Because the GW 600 has changed the data path, the GW 600 may not send the dummy packet, which has been sent to the 4G modem 121 via the 4G signaling APN, any more.

In operation 1217, user data may be transmitted/received via the changed data path. For example, the user data may be transmitted/received between the 4G network and the electronic device via the 4G Internet APN. The RIL 112 may transmit or receive data via the 4G data path. The user data may be, for example, data associated with an application.

6. Case where GW 600 Fails to Receive Link Switching Message 6.1 4G to 5G Switching As described above, in a 4G and 5G interworking environment, a GW (e.g., the GW 600 of FIG. 1) may not send a reception confirm response ACK to an electronic device (e.g., the electronic device 100 of FIG. 1) upon successful reception of signals.

According to an embodiment, the GW that fails to receive the link switching message may send user data to a 4G modem (e.g., the 4G modem 121 of FIG. 2) via the 4G Internet APN, and the electronic device that already changes a data path to 5G may discard data being received via the 4G Internet APN. Likewise, the GW may discard user data that the electronic device sends. In this case, because there is no data transmission/reception via 5G, a 5G RRC may be released, and the electronic device may fall back to 4G and may change the data path to 4G. Because the GW is in a state where the data path is maintained in 4G, the data path may be recovered without an additional operation.

6.2 5G to 4G Switching

According to an embodiment, even though the electronic device already changes the data path to 4G and sends the link switching message to the GW, the GW may fail to receive the corresponding message. In this case, the GW may continue to send a dummy packet, and in this case, the electronic device may recognize that the GW fails to receive the link switching message and may again send the link switching message.

According to an embodiment, an electronic device may include a first modem supporting communication for a first cellular network, a second modem supporting communication for a second cellular network, a processor electrically coupled to the first modem and the second modem, and a memory electrically coupled to the processor and including instructions.

According to an embodiment, the instructions, when executed by the processor, may cause the processor to perform an operation associated with a radio interface layer (RIL) corresponding to both the first modem and the second modem, and to acquire control information generated by the second modem via a control path connecting the first modem and the RIL.

According to an embodiment, the instructions, when executed by the processor, may cause the processor to allow the first modem to receive data from the first cellular network, to acquire data received from the first cellular network via a first data path connecting the first modem and the RIL, and to acquire data received from the second cellular network via a second data path connecting the second modem and the RIL, in response to receiving data from the second network via the second modem.

According to an embodiment, the first data path and the second data path may be configured to at least share a path between the processor and the RIL.

The instructions, when executed by the processor, may cause the processor to switch the first data path and the second data path based on the control information.

According to an embodiment, the second modem may be configured to generate the control information and to send the control information to the first modem.

The second modem may be configured to send the control information to the first modem via a hardware interface.

According to an embodiment, the first modem and the second modem may be configured to exchange wireless connection information.

According to an embodiment, the wireless connection information may include radio resource control (RRC) connection information.

According to an embodiment, the second modem may be configured to generate the control information based on the wireless control information.

According to various embodiments, the first modem may be configured to transmit/receive a signal in a frequency band lower than that of the second modem.

According to an embodiment, the first modem and the second modem may be configured to transmit or receive a signal via inter processor communication (IPC).

According to an embodiment, the first modem may be configured to send the control information to the RIL via the IPC.

According to an embodiment, the same Internet protocol (IP) address may be allocated to the first modem and the second modem.

According to an embodiment, the first modem and the second modem may be configured to share one secure circuit.

According to an embodiment, an electronic device may include a first modem transmitting/receiving a signal supporting communication for a first cellular network, a second modem transmitting/receiving a signal supporting communication for a second cellular network, a processor electrically coupled to the first modem and the second modem, and a memory electrically coupled to the processor and including instructions.

According to an embodiment, the instructions, when executed by the processor, may cause the processor to establish a control path for transmitting/receiving control information between the processor and the first modem and to acquire control information generated by the second modem via the control path.

According to an embodiment, the instructions, when executed by the processor, may cause the processor to establish a first data path between the processor and the first modem and to establish a second data path between the processor and the second modem.

According to an embodiment, the control information may cause the processor to switch the first data path and the second data path.

According to an embodiment, the control information may be transmitted or received between the processor and the first modem via inter processor communication (IPC).

According to an embodiment, the control information may be transmitted or received between the first modem and the second modem via a hardware interface.

According to an embodiment, the same IP address may be allocated to the first modem and the second modem.

According to an embodiment, an electronic device may include a first modem supporting a first cellular network using a first frequency range, a second modem supporting a second cellular network using a second frequency range higher than the first frequency range, a processor electrically coupled to the first modem and the second modem, and a memory electrically coupled to the processor and storing instructions.

According to an embodiment, the instructions, when executed by the processor, may cause the processor to allow the electronic device to access the first cellular network via the first modem, to receive data from the first cellular network via a first data path between the first modem and the processor, to allow the electronic device to access the second cellular network via the second modem while maintaining a connection of the electronic device with the first cellular network, and to receive the data from the second cellular network via a second data path between the second modem and the processor, and the first data path and the second data path may be configured to share at least a portion with each other.

According to an embodiment, an electronic device may include a first wireless communication modem configured to provide first wireless communication with a first frequency range, a second wireless communication modem configured to provide second wireless communication with a second frequency range higher than the first frequency range, wherein the second wireless communication modem is configured to exchange control information with the first wireless communication modem, a processor operatively coupled to the first wireless communication modem and the second wireless communication modem, and a memory operatively coupled to the processor and including instructions. The instructions, when executed by the processor, may cause the processor to provide a radio interface layer (RIL) configured to form a first data path with the first wireless communication modem and to form a second data path with the second wireless communication modem, to allow the RIL to directly exchange a first control signal associated with the first wireless communication modem with the first wireless communication modem, and to allow the RIL to exchange a second control signal associated with the second wireless communication modem via the first wireless communication modem.

According to an embodiment, the first frequency range may be selected between 500 MHz and 3000 MHz, and the second frequency range may be selected from 20 GHz or higher.

According to an embodiment, the first wireless communication modem may include an inter process communication (IPC) interface set for an interface with an RIL.

According to an embodiment, the first wireless communication modem may include first instructions, the second wireless communication modem may include second instructions, and the first instructions and the second instructions, when executed, may cause the second wireless communication modem to exchange the control information with the first wireless communication modem.

According to an embodiment, the first wireless communication modem may be coupled to the second wireless communication modem via a hardware interface.

According to an embodiment, the hardware interface may include at least one of a universal asynchronous receiver/transmitter (UART), a high speed-UART (HS-UART), an inter integrated circuit (I2C), or a serial peripheral interface bus (SPI).

According to an embodiment, the electronic device may include a first multi-mode controller (MMC) and a second MMC, and the first MMC and the second MMC may be configured to exchange the control information via the hardware interface.

According to an embodiment, the second wireless communication modem may be configured to determine to use a network supporting the second frequency range and to provide a control signal associated with the determination to the RIL via the first wireless communication modem.

According to an embodiment, the first wireless communication modem may provide a radio resource control (RRC) status notification to the second wireless communication modem, and the second wireless communication modem may be configured to make the determination based at least on the notification.

According to an embodiment, the control information may include at least one of an RRC state, a switching message, inter process communication (IPC) information, or received signal strength indicator (RSSI) information.

According to an embodiment, an electronic device may include a first wireless communication modem configured to provide first wireless communication with a first frequency range, a second wireless communication modem configured to provide second wireless communication with a second frequency range at least partially identical to or higher than the first frequency range, wherein the second wireless communication modem is configured to exchange control information with the first wireless communication modem, a processor operatively coupled to the first wireless communication modem and the second wireless communication modem, and a memory operatively coupled to the processor and including instructions.

The instructions, when executed by the processor, may cause the processor to provide a radio interface layer (RIL) configured to form a first data path with the first wireless communication modem and to form a second data path with the second wireless communication modem, to allow the RIL to directly exchange a first control signal associated with the first wireless communication modem with the first wireless communication modem, and to allow the RIL to exchange a second control signal associated with the second wireless communication modem via the first wireless communication modem.

Figure 13:
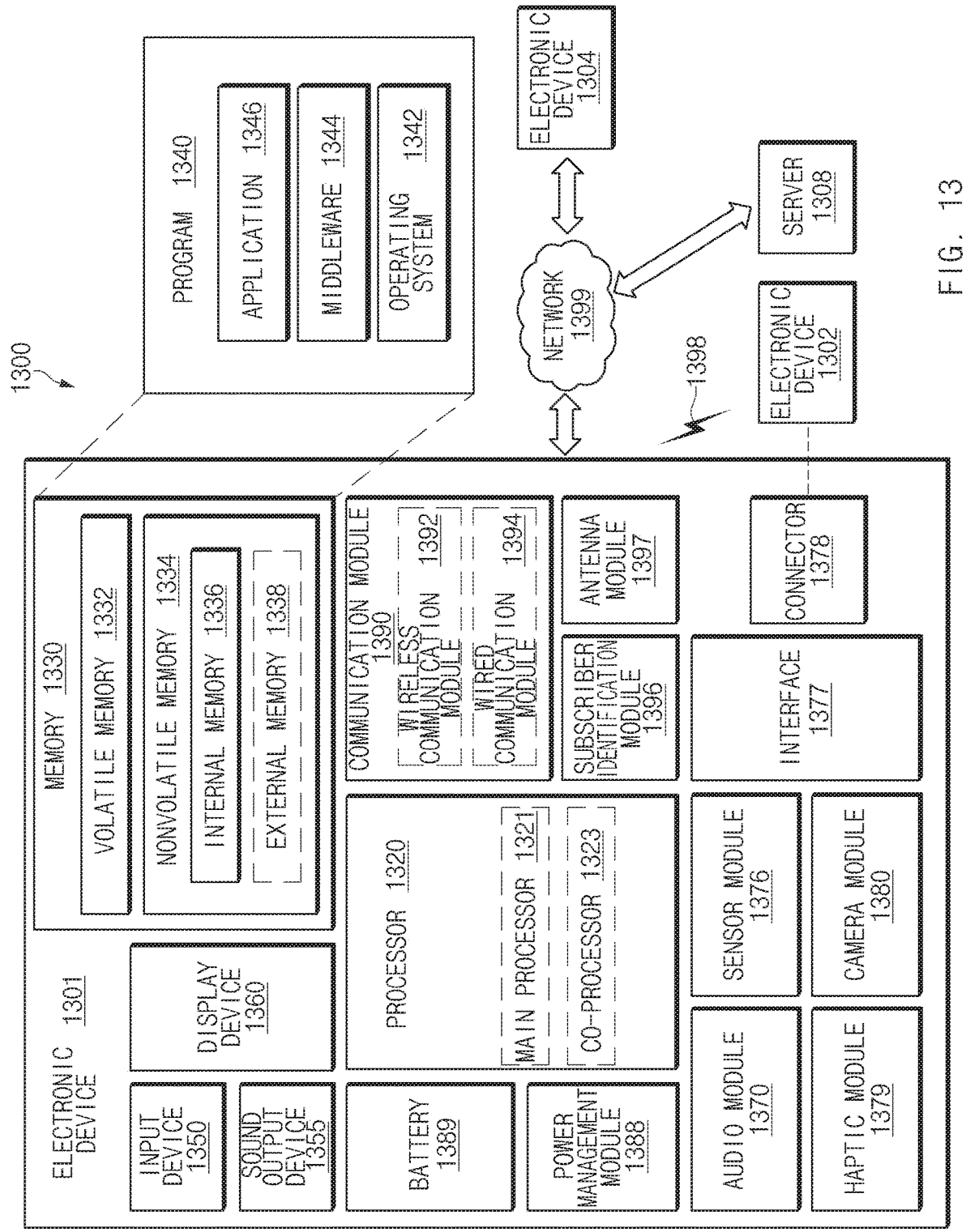
FIG. 13 is a block diagram of an electronic device in a network environment, according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thererto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector), The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™ wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first modem supporting communication for a first cellular network;
a second modem supporting communication for a second cellular network;
a processor electrically coupled to the first modem and the second modem; and
a memory electrically coupled to the processor and storing instructions, wherein the instructions, when executed by the processor, cause the processor to:
perform an operation associated with a radio interface layer (RIL) corresponding to both the first modem and the second modem; and
acquire control information generated by the second modem via a control path connecting the first modem and the RIL,
wherein the second modem is configured to generate the control information and to send the control information to the first modem.

2. The electronic device of claim 1, wherein the instructions, when executed by the processor, cause the processor to:
allow the first modem to receive data from the first cellular network;
acquire data received from the first cellular network via a first data path connecting the first modem and the RIL; and
acquire data received from the second cellular network via a second data path connecting the second modem and the RIL, in response to receiving data from the second network via the second modem, and
wherein the first data path and the second data path are configured to at least share a path between the processor and the RIL.

3. The electronic device of claim 2, wherein the instructions, when executed by the processor, cause the processor to switch the first data path and the second data path based on the control information.

4. The electronic device of claim 1, wherein the second modem is configured to send the control information to the first modem via a hardware interface.

5. The electronic device of claim 1, wherein the first modem is configured to transmit or receive a signal in a frequency band lower than that of the second modem.

6. The electronic device of claim 1, wherein the first modem and the second modem are configured to transmit or receive a signal via inter processor communication (IPC).

7. The electronic device of claim 1, wherein the first modem is configured to send the control information to the RIL via the IPC.

8. The electronic device of claim 1, wherein the same Internet protocol (IP) address is allocated to the first modem and the second modem.

9. An electronic device comprising:
a first wireless communication modem configured to provide first wireless communication with a first frequency range;
a second wireless communication modem configured to provide second wireless communication with a second frequency range higher than the first frequency range, wherein the second wireless communication modem is configured to exchange control information with the first wireless communication modem;

a processor operatively coupled to the first wireless communication modem and the second wireless communication modem; and a memory operatively coupled to the processor and including instructions, wherein the instructions, when executed by the processor, cause the processor to:

provide a radio interface layer (RIL) configured to form a first data path with the first wireless communication modem and to form a second data path with the second wireless communication modem;

allow the RIL to directly exchange a first control signal associated with the first wireless communication modem with the first wireless communication modem; and allow the RIL to exchange a second control signal associated with the second wireless communication modem via the first wireless communication modem, wherein the second wireless communication modem is configured to generate the control information and to send the control information to the first wireless communication modem.

10. The electronic device of claim 9, wherein the first frequency range is selected between 500 MHz and 3000 MHz, and wherein the second frequency range is selected from 20 GHz or higher.

11. The electronic device of claim 9, wherein the first wireless communication modem includes an inter process communication (IPC) interface set for an interface with the RIL.

12. The electronic device of claim 9, wherein the first wireless communication modem includes first instructions, wherein the second wireless communication modem includes second instructions, and wherein the first instructions and the second instructions, when executed, cause the second wireless communication modem to exchange the control information with the first wireless communication modem.

13. The electronic device of claim 9, wherein the first wireless communication modem is coupled to the second wireless communication modem via a hardware interface.

14. The electronic device of claim 13, wherein the hardware interface includes at least one of a universal asynchronous receiver/transmitter (UART), a high speed-UART (HS-UART), an inter integrated circuit (I2C), or a serial peripheral interface bus (SPI).

* * * * *